(12) United States Patent
Kuwabara et al.

(10) Patent No.: US 10,013,951 B2
(45) Date of Patent: Jul. 3, 2018

(54) DISPLAY CONTROL DEVICE, DISPLAY DEVICE, DISPLAY CONTROL PROGRAM, DISPLAY CONTROL METHOD, AND RECORDING MEDIUM

(71) Applicant: Panasonic Intellectual Property Management Co., Ltd., Osaka (JP)

(72) Inventors: Takashi Kuwabara, Kanagawa (JP); Hitoaki Akahori, Tokyo (JP); Kazuhiro Morishita, Kanagawa (JP); Terumitsu Suenaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 15/121,025

(22) PCT Filed: Feb. 27, 2015

(86) PCT No.: PCT/JP2015/001025
§ 371 (c)(1),
(2) Date: Aug. 23, 2016

(87) PCT Pub. No.: WO2015/136874
PCT Pub. Date: Sep. 17, 2015

(65) Prior Publication Data
US 2017/0011709 A1    Jan. 12, 2017

(30) Foreign Application Priority Data
Mar. 13, 2014  (JP) ................................. 2014-049643

(51) Int. Cl.
G09G 5/02       (2006.01)
B60K 35/00      (2006.01)
(Continued)

(52) U.S. Cl.
CPC ............ *G09G 5/026* (2013.01); *B60K 35/00* (2013.01); *G02B 27/0101* (2013.01);
(Continued)

(58) Field of Classification Search
CPC ................ G09G 5/26; G09G 2380/10; G09G 2320/0666; B60K 25/00;
(Continued)

(56) References Cited

FOREIGN PATENT DOCUMENTS

| JP | 2005-138801 | 6/2005 |
|----|-------------|--------|
| JP | 2010-149734 | 7/2010 |
| WO | 2013/128573 | 9/2013 |

OTHER PUBLICATIONS

International Search Report of PCT application No. PCT/JP2015/001025 dated May 19, 2015.

*Primary Examiner* — Thai Tran
*Assistant Examiner* — Christopher T Braniff
(74) *Attorney, Agent, or Firm* — Seed IP Law Group LLP

(57) ABSTRACT

A display control device includes an input unit receiving a recognition result of a surrounding situation of a vehicle; and control circuitry controlling an image generating device such that a predetermined image indicating a presentation image at the time of being displayed on a display medium transmitting light is generated in a case in which a predetermined target is recognized in the vicinity of the vehicle. The control circuitry senses, on the basis of the recognition result, that a color of a foreground of the vehicle on which the first presentation image is superimposed in the display medium is changed from a first color to a second color.

12 Claims, 26 Drawing Sheets

(51) Int. Cl.
*G02B 27/01* (2006.01)
*G06T 11/00* (2006.01)
*H04N 7/18* (2006.01)
*G06K 9/00* (2006.01)

(52) U.S. Cl.
CPC ........ *G06K 9/00791* (2013.01); *G06T 11/001* (2013.01); *H04N 7/183* (2013.01); *B60K 2350/2008* (2013.01); *G02B 2027/014* (2013.01); *G02B 2027/0112* (2013.01); *G02B 2027/0118* (2013.01); *G02B 2027/0141* (2013.01); *G09G 2320/066* (2013.01); *G09G 2320/0666* (2013.01); *G09G 2380/10* (2013.01)

(58) Field of Classification Search
CPC ........ B60K 2350/2008; B02B 27/0101; G02B 2027/0112; G02B 2027/0118; G02B 2027/014; G06T 11/001; H04N 7/183; G06K 9/00791
See application file for complete search history.

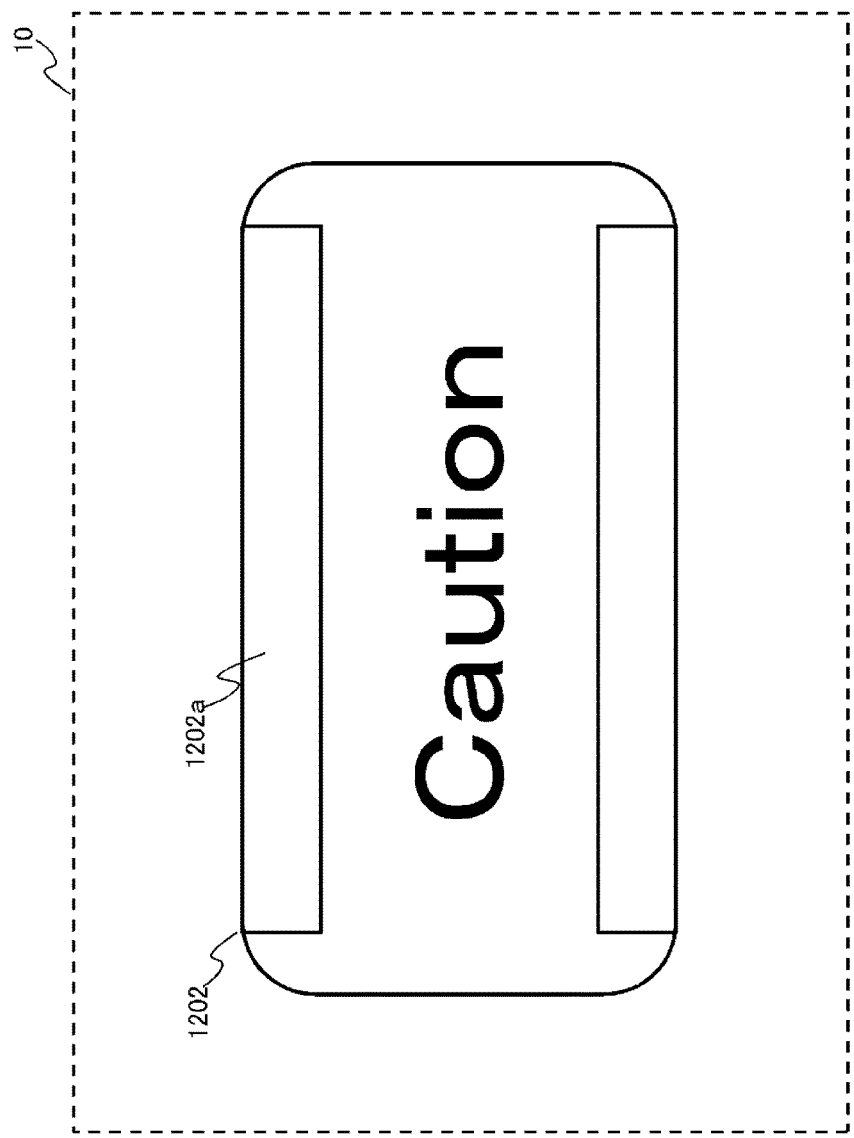

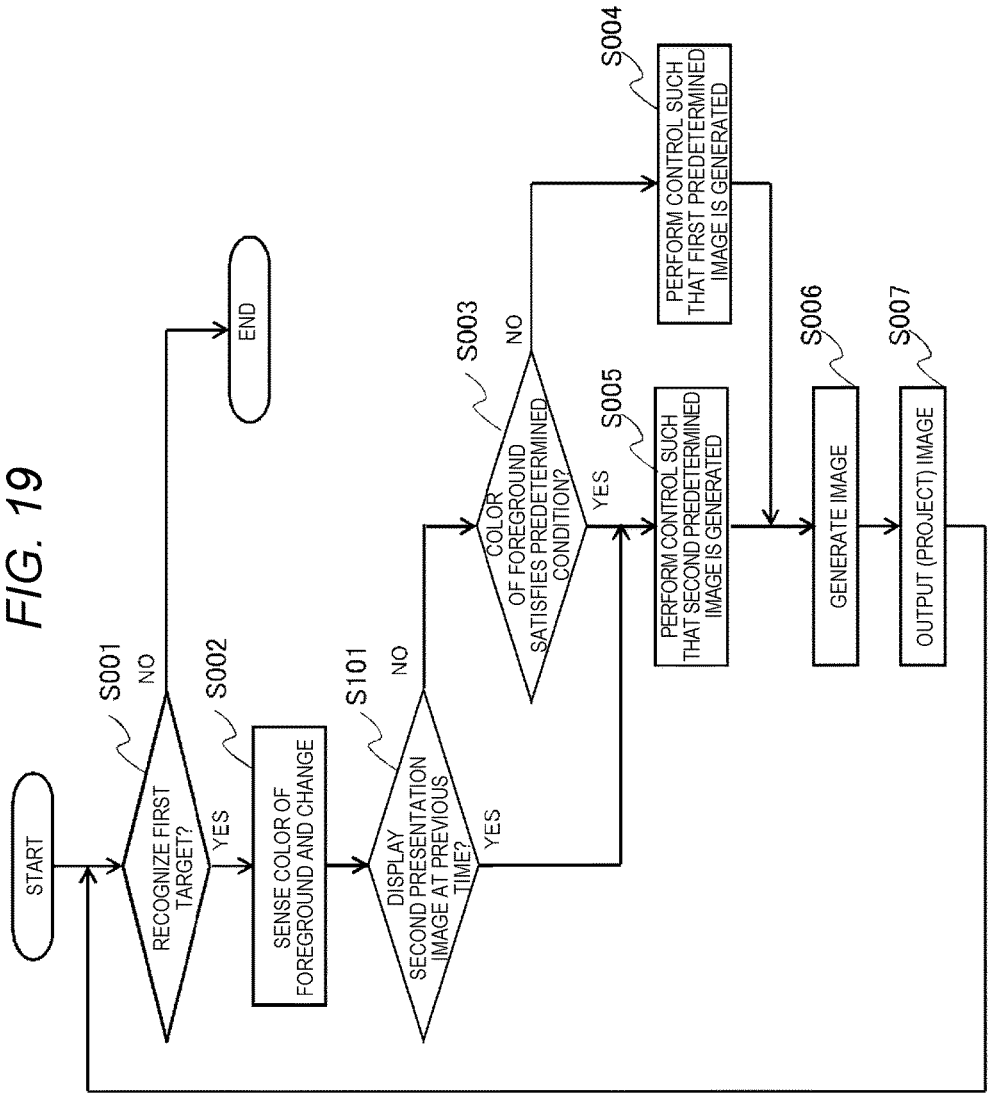

DISPLAY CONTROL DEVICE, DISPLAY DEVICE, DISPLAY CONTROL PROGRAM, DISPLAY CONTROL METHOD, AND RECORDING MEDIUM

CROSS-REFERENCE TO RELATED APPLICATIONS

This application is a U.S. national stage application of the PCT International Application No. PCT/JP2015/001025 filed on Feb. 27, 2015, which claims the benefit of foreign priority of Japanese patent application 2014-049643 filed on Mar. 13, 2014, the contents all of which are incorporated herein by reference.

1. FIELD OF THE INVENTION

The present disclosure relates to a display control device controlling display of information which is provided to an occupant of a vehicle or the like, a display device, a display control program, a display control method, and a recording medium.

2. DESCRIPTION OF THE RELATED ART

Recently, a driving support system presenting navigation information, warning information with respect to an obstacle, and the like to an occupant of a vehicle has been intensely developed. A head-up display device has attracted attention as the driving support system. The head-up display device projects, for example, an action support image such as an arrow to front glass of the vehicle. Accordingly, a driver of a vehicle or an aircraft is able to visually recognize the action support image while looking forward during driving. Here, the action support image is also referred to as a presentation image.

However, in a case where a foreground of the front glass has a similar color to that of the arrow, it is difficult for the occupant of the vehicle to visually recognize the action support image. In such a case, examples of a method of increasing visibility of the action support image include a technology disclosed in PTL 1.

The technology disclosed in PTL 1 is a head-up display device provided with a combiner which is able to reduce a shift in driver's eyes, a projection unit which projects an image to the combiner by projecting light from a light source to a displayer, and control circuitry which controls the projection unit. Further, the technology disclosed in PTL 1 is provided with a background color detection unit which detects a background color of a display image, and a display color control unit which controls a display color of the image projected according to the background color.

CITATION LIST

Patent Literature

PTL 1: Japanese Patent Unexamined Publication No. 2005-138801

SUMMARY OF THE INVENTION

However, in a method disclosed in PTL 1, there is room for improvement on recognition of the occupant of the vehicle with respect to the presentation image.

Therefore, one aspect of the present disclosure provides a display control device which displays a presentation image which has high visibility while retaining the meaning of the image.

The display control device according to one aspect of the present disclosure includes an input unit receiving a recognition result of a surrounding situation of a vehicle; and control circuitry controlling an image generating device such that a predetermined image is generated in a case in which a predetermined target is recognized in the vicinity of the vehicle. The predetermined image indicates a presentation image at the time of being displayed on a display medium transmitting light. The control circuitry causes the image generating device to generate a first predetermined image indicating a first presentation image. In addition, the control circuitry senses, on the basis of the recognition result, that a color of a foreground of the vehicle on which the first presentation image is superimposed in the display medium is changed from a first color to a second color different from the first color. Then, the control circuitry causes the image generating device to generate a second predetermined image indicating a second presentation image when the second color satisfies a predetermined condition with respect to a third color of at least a part of an outer peripheral region in the first presentation image. The second presentation image includes at least a region other than the outer peripheral region in the first presentation image, and a color of at least a part of an outer peripheral region in the second presentation image is a fourth color different from the third color.

Furthermore, comprehensive or specific aspects thereof may be realized by a system, a method, an integrated circuit, a computer program, or a recording medium, or may be realized by an arbitrary combination of a system, a device, a method, an integrated circuit, a computer program, and a recording medium.

According to the display control device of the present disclosure, for example, an internal region of the presentation image such as an arrow is identical to the original design, and the original meaning of the presentation image is retained, and thus, a driver or the like easily identifies the presentation image. Then, a region having a different color is disposed on at least a part of the outer periphery of the presentation image, and thus, even in a case where an object having a similar color or the like is superimposed on the foreground of the display medium, the driver easily recognizes the presentation image.

BRIEF DESCRIPTION OF DRAWINGS

FIG. 12B is a diagram illustrating an example of the presentation image according to Exemplary Embodiment 2 of the present disclosure.

FIG. 19 is an operation flowchart of the display system according to Exemplary Embodiment 2 of the present disclosure.

DESCRIPTION OF EMBODIMENTS DETAILED DESCRIPTION OF THE PREFERRED EMBODIMENTS (Considerations of Related Documents)

In a case where an arrow performing action support has a red color, and a front glass foreground has a red color, the method disclosed in PTL 1 changes the entire arrow which is an action support image, for example, to have a white color, or increases brightness. Thus, it is possible to increase visibility of an occupant of a vehicle with respect to an action support image. However, in a case where the entire color or the like of the arrow is suddenly changed, the driver of the vehicle is confused whether or not the action support image is changed to an action support image having another meaning. Thus, it is difficult for the driver of the vehicle to identify the meaning of the action support image. The display control device according to the present disclosure has an effect in which a presentation image having high visibility is able to be presented to the occupant of the vehicle while retaining the meaning of the image. Furthermore, the visibility indicates ease of exhibiting the action support image to the occupant. The visibility also indicates remarkability. Hereinafter, examples in which head-up display (hereinafter, HUD) devices according to various aspects of the present disclosure are mounted on an automobile will be described by using the appended drawings.

Exemplary Embodiment 1

Figure 1:
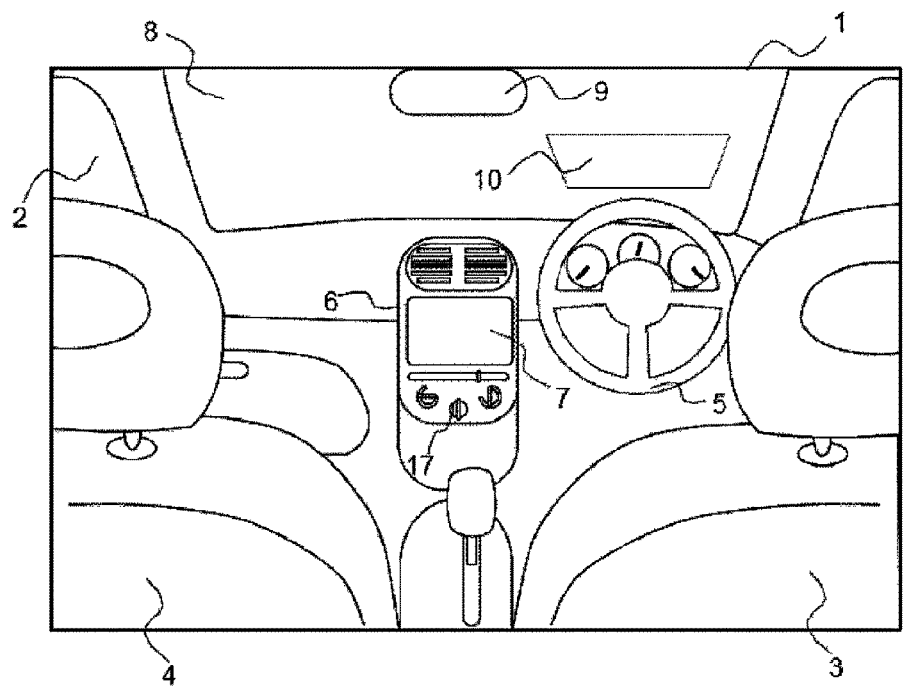
FIG. 1 is an in-vehicle front diagram of an automobile on which a head-up display device according to Exemplary Embodiment 1 of the present disclosure is mounted.

FIG. 1 illustrates the inside of automobile 1. In automobile 1, in-vehicle 2 includes driving seat 3, passenger seat 4, handle 5, and onboard equipment 6. Onboard equipment 6 includes displayer 7. Music information, radio tuning, or the like is displayed on displayer 7. Front glass 8 (an example of a partition wall) partitioning in-vehicle 2 from the outside of the vehicle is disposed on the foremost portion of in-vehicle 2.

In this exemplary embodiment, display medium 10, for example, is positioned in a lower portion of front glass 8. A predetermined image is projected from a display source (not illustrated) onto display medium 10. The predetermined image projected onto display medium 10 is visually recognized by a driver of automobile 1 as a virtual image. Furthermore, the display source, for example, has a projector function.

Figure 2:
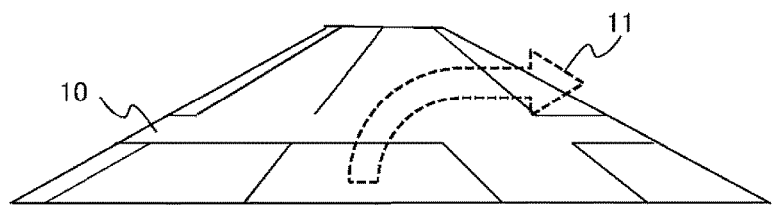
FIG. 2 is a diagram illustrating display of the head-up display device according to Exemplary Embodiment 1 of the present disclosure.

FIG. 2 illustrates an example of the presentation image projected onto display medium 10. As illustrated in FIG. 2, an action support image performing action support of the driver, for example, an image of arrow image 11 is displayed on display medium 10 as a virtual image.

Then, the image indicating arrow image 11 is displayed on display medium 10 as the virtual image, and thus, the driver of automobile 1 visually recognizes the image indicating arrow image 11 by superimposing the image on a foreground of front glass 8. As a result thereof, the driver is able to visually recognize the image of arrow image 11 by superimposing the image on the road in a turning direction.

Figure 3:
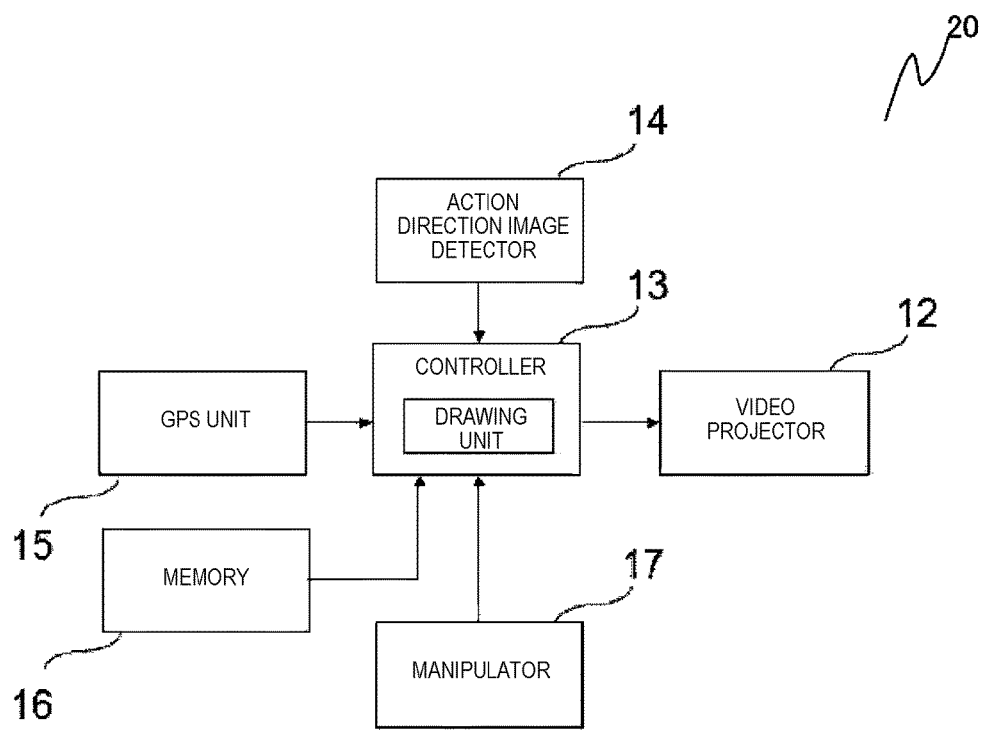
FIG. 3 is a control block diagram of the head-up display device according to Exemplary Embodiment 1 of the present disclosure.

FIG. 3 illustrates a configuration diagram of head-up display system (hereinafter, HUD system) 20 according to one aspect of the present disclosure. HUD system 20 includes video projector 12, control circuitry 13, action direction image detector 14, GPS unit 15, memory 16, and manipulator 17. The image indicating arrow image 11, which is an example of an action support video, is projected from video projector 12 included in HUD system 20.

Video projector 12 is connected to control circuitry 13, and action direction image detector 14, GPS unit 15, memory 16, and manipulator 17 are connected to control circuitry 13. Control circuitry 13 has a drawing function of drawing arrow image 11.

Action direction image detector 14, for example, is configured of a camera (not illustrated) as described in PTL 1, and is disposed on the front side of room mirror 9 of FIG. 1. The camera of action direction image detector 14 is able to obtain substantially the same video as the front video of front glass 8 seen from the driver.

GPS unit 15 detects a current position and an advance direction for executing car navigation. Memory 16 stores map information, an operation program, or the like for executing the car navigation. Manipulator 17 inputs activation of a function of the car navigation and life time of the activation of the function of HUD system 20. In addition, manipulator 17 inputs destination information.

In the configuration described above, when the driver inputs a destination by manipulator 17, and performs driving by using a car navigation function, control circuitry 13 projects the predetermined image indicating arrow image 11 onto display medium 10 by using video projector 12.

In this exemplary embodiment, the image indicating arrow image 11, for example, has a red color. For this reason, in general, red arrow image 11 is seen by the driver of automobile 1 by being superimposed on the road in the turning direction.

Figure 4:
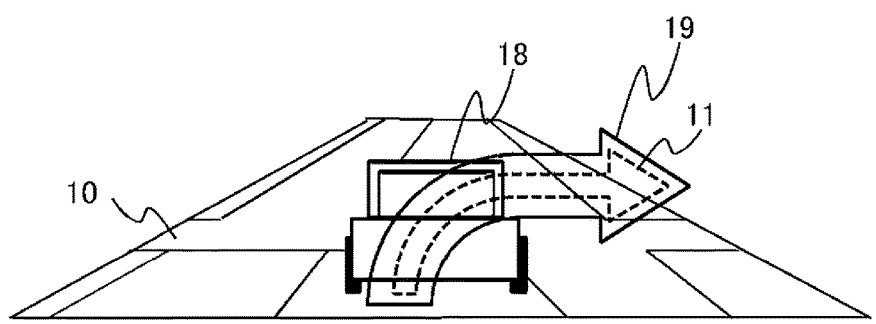
FIG. 4 is a diagram illustrating the display of the head-up display device according to Exemplary Embodiment 1 of the present disclosure.
Figure 5:
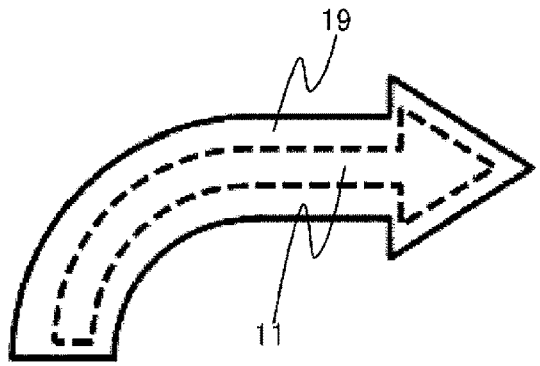
FIG. 5 is a diagram illustrating the display of the head-up display device according to Exemplary Embodiment 1 of the present disclosure.

However, as illustrated in FIG. 4, in a case where preceding car 18 is a red car, and arrow image 11 is displayed, arrow image 11 is visually recognized by being superimposed on preceding car 18. In this exemplary embodiment, as illustrated in FIG. 4 and FIG. 5, an image in which frame body display 19 is disposed on an outer periphery of arrow image 11 is displayed on display medium 10. In a case where arrow image 11 has a first color, frame body display 19 is displayed in a second color different from the first color. Furthermore, for the sake of convenience of description, the first color, for example, is described as a red color, and the second color, for example, is described as a white color or a blue color. Furthermore, the red color may be a warm color, and the white color or the blue color may be a cool color.

That is, arrow image 11 projected from video projector 12 onto front glass 8, for example, is red, and in a case where arrow image 11 has a similar color to the color of a video detected by action direction image detector 14, frame body display 19 having a white color or a blue color different from the red color is displayed on the outer periphery of arrow image 11.

At this time, arrow image 11, which is an example of the action support video, is in the same state or the same color so far, and thus, uneasiness is not imparted to the driver or the like.

In addition, even in a case where the action support video of arrow image 11 or the like has the same color as that in a normal state, on the outer periphery of arrow image 11, frame body display 19 having a color different from the color of arrow image 11 in the normal state is displayed. For this reason, arrow image 11 is displayed in a frame by frame body display 19, and thus, remarkability of the display increases. As a result thereof, the driver or the like is able to perform driving according to arrow image 11.

Figure 6:
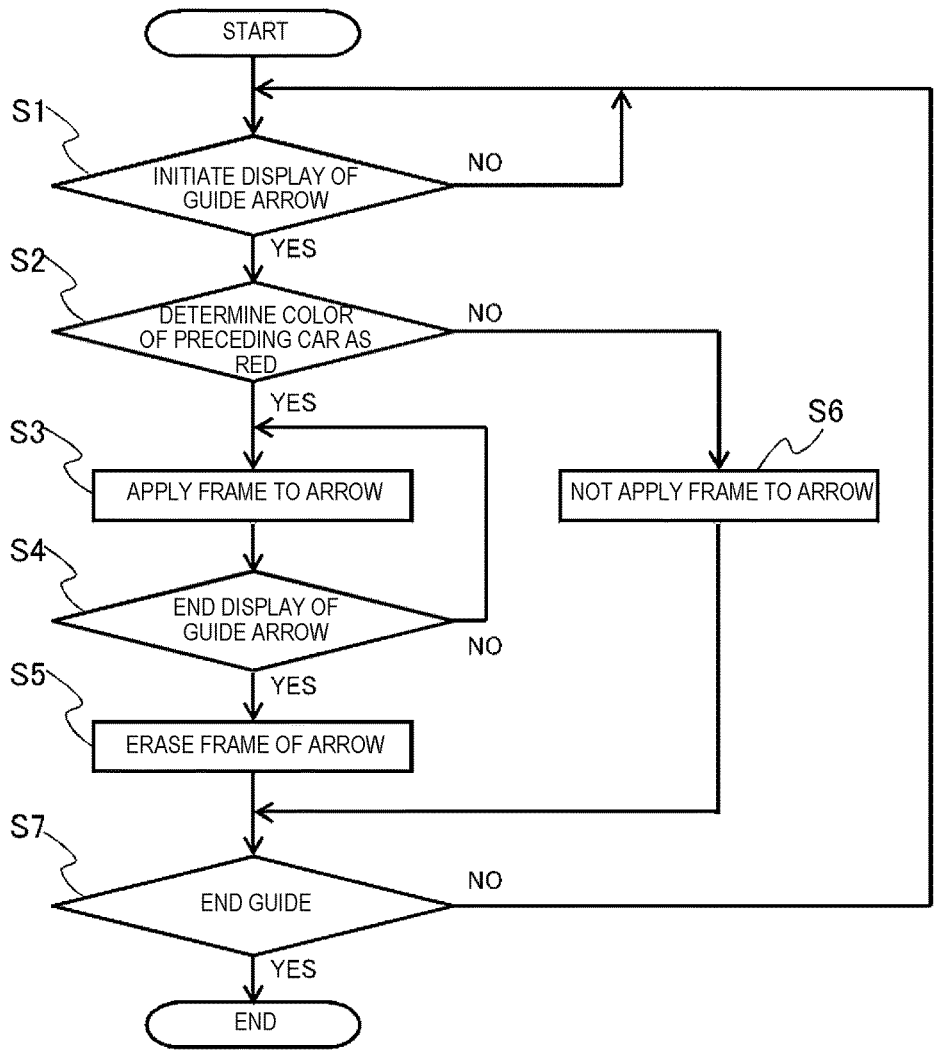
FIG. 6 is an operation flowchart of the head-up display device according to Exemplary Embodiment 1 of the present disclosure.

FIG. 6 illustrates an operation flowchart of HUD system 20. Action direction image detector 14 consistently obtains substantially the same video as the front video of front glass 8 seen from the driver. Here, the front video of front glass 8 indicates a front video of display medium 10 positioned in the lower portion of front glass 8.

In Step S1, it is determined whether or not the display of arrow image 11 is initiated. When the display of arrow image 11 is initiated (S1: Yes), the flow proceeds to Step S2. On the other hand, when the display of arrow image 11 is not initiated (S1: No), the system is in a standby state.

In Step S2, in a case where the color of preceding car 18 or the like is a similar color to that of arrow image 11 in a state where the arrow image 11 is displayed (S2: Yes), the flow proceeds to Step S3. In Step S3, control circuitry 13 displays frame body display 19 having a color different from the color of arrow image 11 on the outer periphery of arrow image 11. On the other hand, in Step S2, in a case where the color of preceding car 18 is not a red color (S2: No), the flow proceeds to Step S6. In Step S6, arrow image 11 not including frame body display 19 illustrated in FIG. 2 is displayed.

Next, in Step S4, it is determined whether or not the display of a guide arrow ends. The guide arrow indicates an arrow including arrow image 11 or arrow image 11 and frame body display 19. For example, in a case where automobile 1 is turned around the corner, and arrow image 11 is erased (S4: Yes), control circuitry 13 erases frame body display 19 in Step S5. On the other hand, when the display of the guide arrow does not end (S4: No), the flow returns to Step S3, and arrow image 11 is continuously displayed.

Then, in a case where it is determined whether or not the guide ends in Step S7, and the guide ends (S7: Yes), the flow ends. For example, the guide ends at the time of arriving at the destination. On the other hand, in a case where the guide does not end (S7: No), the flow returns to Step S1.

As described above, in this exemplary embodiment, in a case where the color of the foreground which is superimposed on display medium 10 is a similar color or the like to the color of an outer peripheral region of arrow image 11, a presentation image including at least a region other than the outer peripheral region in arrow image 11, in which the color of at least a part of the outer peripheral region is changed is displayed on display medium 10. Accordingly, the original color of the presentation image is retained, and thus, it is possible to continuously display a presentation image having high visibility while retaining the meaning of the image in display medium 10 regardless of the color of the foreground.

Furthermore, in the exemplary embodiment described above, frame body display 19 disposed in Step S3 is in a state of being disposed until the guide of arrow image 11 is completed. Accordingly, a fact that frame body display 19 is information with respect to the same event is able to be obviously presented to the driver, and the driver visually recognizes the presentation image, and thus, is not confused whether or not information with respect to a new event is provided. Hereinafter, the details will be described.

For example, a case where preceding car 18 has a red color, and, for example, frame body display 19 having a white color is displayed on the outer periphery of arrow image 11 will be described. In a case where arrow image 11 is not superimposed on preceding car 18 in display medium 10 by moving preceding car 18, arrow image 11 is remarkably visually recognized even in a case where frame body display 19 is not displayed. For this reason, there is a method of erasing frame body display 19, but in this exemplary embodiment, frame body display 19 is continuously displayed without being erased. This is because in a case where frame body display 19 is erased in such a case, a visual sense of arrow image 11 is considerably changed, and thus, the driver is confused whether the same warning with respect to the same event is provided or warning with respect to another new event is provided, and a driving operation is affected.

Figure 7:
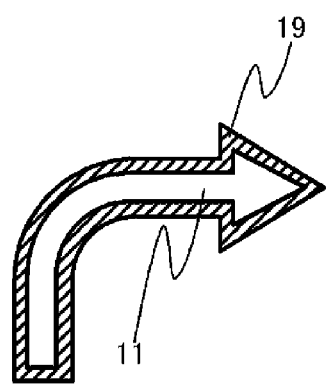
FIG. 7 is a diagram illustrating the display of the head-up display device according to Exemplary Embodiment 1 of the present disclosure.

Furthermore, in the exemplary embodiment described above, as illustrated in FIG. 5, arrow image 11, in which frame body display 19 having the same width is displayed on the entire outer periphery, is the presentation image, and as illustrated in FIG. 7, an arrow in which frame body display 19 on a lower side is wider than frame body display 19 on an upper side may be the presentation image. Accordingly, an effect is obtained in which remarkability of the presentation image increases, and the driver of automobile 1 easily recognizes arrow image 11.

Figure 8:
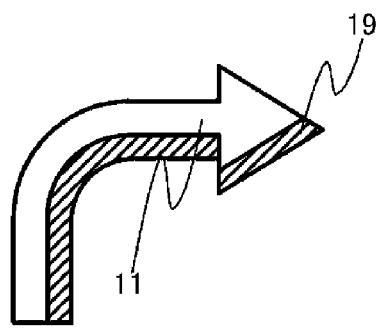
FIG. 8 is a diagram illustrating the display of the head-up display device according to Exemplary Embodiment 1 of the present disclosure.

In addition, the upper side of arrow image 11 becomes a space for confirming the front of automobile 1 by the driver, and thus, in a case where the width of frame body display 19 on the upper side is narrow, an effect is obtained in which the front is easily confirmed. Further, as illustrated in FIG. 8, frame body display 19 may not be formed on the upper side of arrow image 11, but frame body display 19 may be formed only on the lower side of arrow image 11.

Furthermore, in this exemplary embodiment, arrow image 11 is used as an example of the action support video, and letters, characters, and the like may be used.

Further, a red color is used as the first color of arrow image 11, and other colors may be used. Further, a white color or a blue color is used as the second color of frame body display 19, and other colors which are able to emphasize the first color of arrow image 11 may be used. For example, arrow image 11 of the action support video may be displayed in a yellow color, and frame body display 19 may be displayed in a blue color.

Exemplary Embodiment 2

Figure 9:
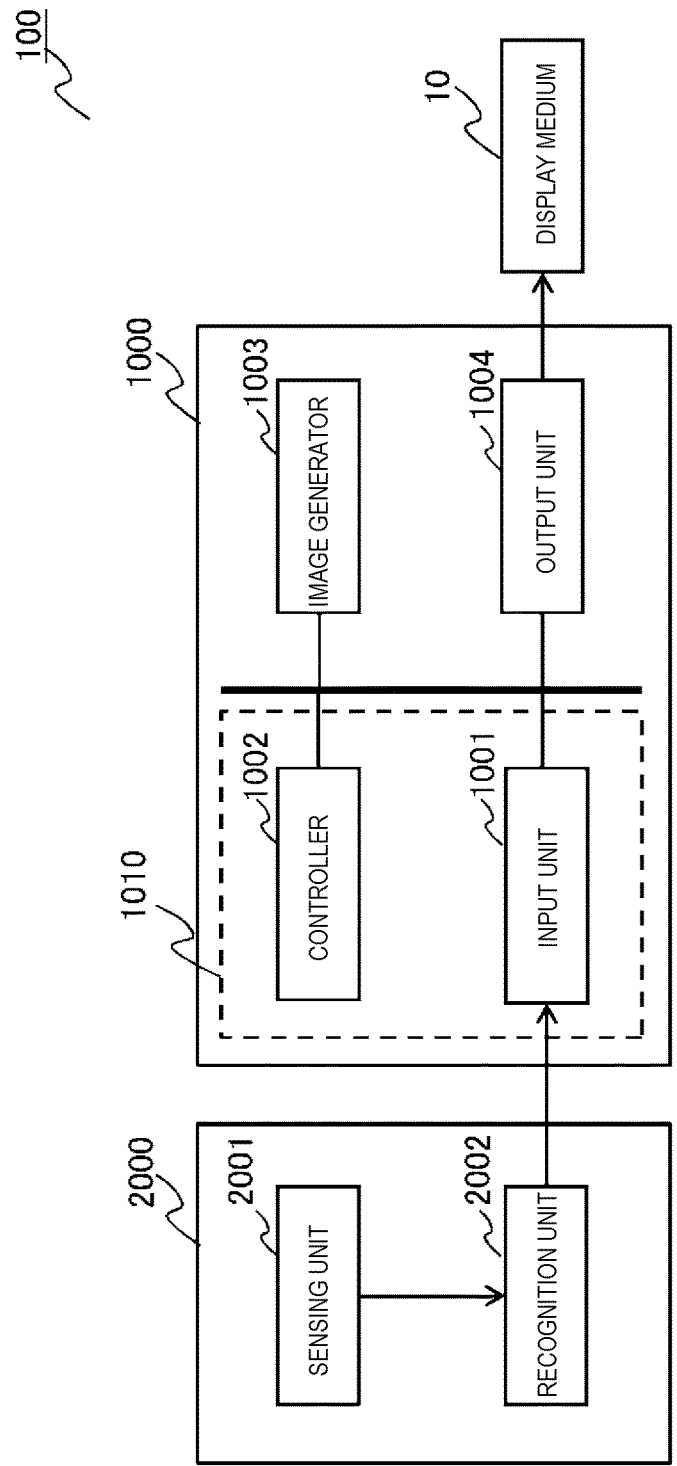
FIG. 9 is a block diagram illustrating a configuration example of a display control device according to Exemplary Embodiment 2 of the present disclosure.

Next, a configuration example of display system 100 according to Exemplary Embodiment 2 of the present disclosure will be described. FIG. 9 illustrates an example of a block configuration of display system 100.

Display system 100, for example, is used in a movable body such as a vehicle. Display system 100 may be an onboard device, or may be a portable information terminal introduced into a vehicle. In this exemplary embodiment, a case where display system 100 is applied to the vehicle will be described, but the movable body is not limited to the vehicle, and may be a ship, an aircraft, or the like. In addition, in this exemplary embodiment, an example where a user is the occupant of the vehicle, and in particular, a driver of the vehicle will be described, but it is not limited thereto. In addition, display system 100 may be used in a wearable computer (for example, HMD described below) which is able to be mounted on the body by the user.

Display system 100 includes display device 1000, sensor 2000, and display medium 10. In addition, display device 1000 includes display control device 1010 and image generator 1003, output unit 1004. Display control device 1010 includes input unit 1001 and control circuitry 1002. Sensor 2000 includes sensing unit 2001 and recognition unit 2002. Furthermore, in this exemplary embodiment, display medium 10 is a display transmitting light.

Hereinafter, each configuration requirement of display system 100 will be described with reference to FIG. 9.

Sensor 2000 recognizes a surrounding situation of the vehicle. The surrounding situation of the vehicle is at least one of situations of a predetermined target existing in the vicinity of the vehicle and the foreground of the vehicle. The situation of the foreground of the vehicle, for example, is the color of the foreground of the vehicle. The predetermined target, for example, is a road environment such as a movable body, a white line on the road, a sign, a pavement mark, a guardrail, a signaler, a power pole, a building, and an intersection. The movable body, for example, is a vehicle, a person, a bicycle, a two-wheel vehicle, and the like.

Further, sensor 2000 senses the movable body existing in the vicinity of the vehicle, and recognizes at least one of the position, the size, the relative distance, the relative speed, and the like of the movable body. In addition, sensor 2000 may confirm the position of an own vehicle, an intersection corresponding to navigation information set by the occupant, and the like. Hereinafter, sensor 2000 will be described in detail.

Sensor 2000 recognizes the movable body existing in the foreground of the vehicle. In such a case, sensing unit 2001 included in sensor 2000 senses the foreground of the vehicle at a predetermined sampling interval. Sensing unit 2001, for example, is a sensing camera. The sensing camera is mounted on the inside or the outside of the vehicle, and captures the foreground of the vehicle. The sensing camera may capture not only the foreground but also the scene of a side surface. Furthermore, sensing unit 2001, for example, may be laser. Sensing unit 2001 outputs peripheral information indicating a sense result to recognition unit 2002.

Recognition unit 2002 recognizes a predetermined target existing in the vicinity of the vehicle on the basis of the peripheral information received from sensing unit 2001. For example, in a case where sensing unit 2001 is the sensing camera, recognition unit 2002 performs a pattern matching or the like with respect to an image indicating the peripheral information, and thus, recognizes the target. In addition, in a case where sensing unit 2001 is the laser, recognition unit 2002 extracts the target from the peripheral information by clustering, machine learning, or the like, and thus, recognizes the target. Furthermore, a target recognition technology in recognition unit 2002 is a known technology, and thus, the detailed description thereof will be omitted.

In addition, sensor 2000 is able to sense the position of the own vehicle and to confirm the intersection or the like corresponding to the navigation information set by the occupant. In such a case, sensor 2000 senses the position information of the own vehicle and the intersection or the like corresponding to the navigation information set by the occupant, and recognizes distance information or the like between the own vehicle and the intersection or the like. Furthermore, a recognition technology of the own vehicle and traffic information in a navigation system is known, and thus, the detailed description will be omitted.

Sensor 2000 outputs a recognition result of the surrounding situation of the vehicle to display control device 1010 included in display device 1000. The information of the recognition result may include the target existing in the foreground and position information of the target. In addition, the information of the recognition result may include road guidance information corresponding to the navigation information. In addition, the recognition result, for example, may include the existing position of the target, a relative angle of the target with respect to the advance direction of the vehicle (hereinafter, simply referred to as a relative angle), a relative speed between the target and the vehicle, the type of target, information obtained by pattern matching, information obtained by tracking processing of the target, and the like.

Input unit 1001 included in display device 1000 receives the recognition result from sensor 2000. In a case where input unit 1001 is configured of hardware, input unit 1001, for example, may be a connector, an input terminal for inputting a signal, a pin of an integrated circuit, and the like. In addition, input unit 1001 may be an antenna for receiving a signal in wireless communication.

In a case where the predetermined target is recognized in the vicinity of automobile 1, control circuitry 1002 controls image generator 1003 such that image generator 1003 generates a first predetermined image. The first predetermined image is an image indicating a first presentation image at the time of being displayed on display medium 10 transmitting light. Furthermore, image generator 1003 may be referred to as an image generating device.

Further, control circuitry 1002 senses, on the basis of the recognition result, that the color of a front scenery of automobile 1 on which the first presentation image is superimposed is changed from the first color to the second color different from the first color in display medium 10. When the second color satisfies a predetermined condition with respect to a third color of at least a part of the outer peripheral region in the first presentation image, control circuitry 1002 causes image generator 1003 to generate a second predetermined image. The second predetermined image is an image indicating the second presentation image at the time of being displayed on display medium 10. Further, the second presentation image includes at least a region other than the outer peripheral region in the first presentation image, and the color of at least a part of the outer peripheral region in the second presentation image is a fourth color different from the third color. Hereinafter, control circuitry 1002 will be described in detail.

Control circuitry 1002 senses, on the basis of the recognition result received by input unit 1001, that the color of the foreground of automobile 1 on which the first presentation image is superimposed in display medium 10 is changed from the first color to the second color. The foreground on which the first presentation image is superimposed in display medium 10 indicates a partial region of the foreground on which the first presentation image which is displayed on display medium 10 is superimposed when the foreground of the automobile 1 is seen by the user through display medium 10. The recognition result received by input unit 1001 includes color information of the foreground of automobile 1.

Here, relative position information indicating a correspondence relationship between a disposing position of display medium 10 and an image captured by sensor 2000 is retained in a storage unit (not illustrated) in advance. For this reason, control circuitry 1002 is able to calculate which region of the image captured by sensor 2000 is superimposed on display medium 10 at the time of seen from the user. Further, control circuitry 1002 retains the position information in which the first presentation image is displayed in display medium 10. For this reason, control circuitry 1002 is able to determine the color of the foreground on which the first presentation image is superimposed in display medium 10. Then, control circuitry 1002 is able to sense that the color of the foreground is changed from the first color to the second color.

Furthermore, the relative position information may be a distinctive fixed value of the vehicle, or may be relative position information customized for each user. In a case where the relative position information is customized for each user, for example, in display system 100, the position of at least one of display medium 10 and display device 1000 is able to be mechanically or electrically operated. Then, information of the mechanical or electrical operation is reflected on the relative position information between the disposing position of display medium 10 and the image captured by sensor 2000.

Furthermore, a method of customizing the relative position information for each user is determined on the basis of the design specification of display system 100, but it is not limited thereto. In addition, a method of calculating the region of the foreground on which the first presentation image is superimposed in display medium 10 on the basis of the relative position information between the disposing position of display medium 10 and the image captured by sensor 2000 is a known technology, but does not limit the range of the present disclosure.

In addition, in the above description, control circuitry 1002 determines the color of the foreground on which the first presentation image is superimposed in display medium 10, and may determine the color of the foreground on the basis of a dominant color in the color of the foreground superimposed on display medium 10. For example, the color of the foreground may be determined by using a color occupying only an area of a predetermined ratio in the foreground superimposed on display medium 10. The predetermined ratio, for example, may be greater than or equal to 50%.

In addition, in the above description, control circuitry 1002 determines the color of the foreground on which the first presentation image is superimposed in display medium 10, and the color of the foreground may be the color of a predetermined region in the foreground superimposed on display medium 10.

That is, control circuitry 1002 may determine the color of the foreground superimposed on a peripheral region of the region on which the first presentation image is superimposed in display medium 10. In addition, control circuitry 1002 may determine the color of the foreground superimposed on a predetermined region (for example, one of four corners of display medium 10) other than the region on which the first presentation image is superimposed in display medium 10. Thus, control circuitry 1002 is able to determine the color of the foreground regardless of the position information of the first presentation image. For this reason, the operation amount is reduced. Further, a color change is able to be determined before the color of the foreground superimposed on the first presentation image in display medium 10 is changed from the first color to the second color. For this reason, when the color of the foreground superimposed on the first presentation image is changed, the second presentation image is able to be presented to the user.

Here, in this exemplary embodiment, the first color, for example, is described as a color existing on the road, such as gray, white, and black. Furthermore, the first color is not limited to gray or the like, but may be an arbitrary color.

Figure 11A:
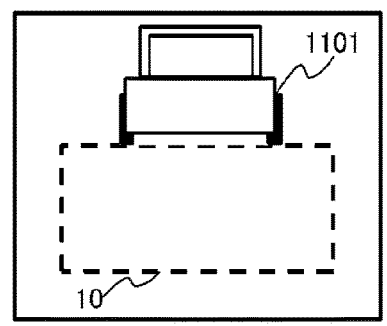
FIG. 11A is a diagram illustrating an example of a foreground which is superimposed on a display medium according to Exemplary Embodiment 2 of the present disclosure.
Figure 11B:
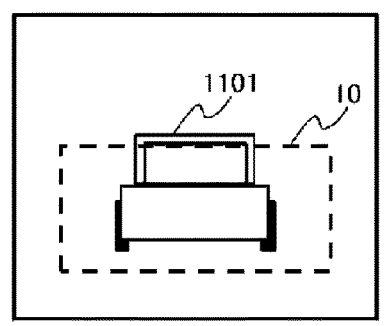
FIG. 11B is a diagram illustrating an example of the foreground which is superimposed on the display medium according to Exemplary Embodiment 2 of the present disclosure.

FIG. 11A and FIG. 11B illustrate conceptual diagrams when the foreground is seen by the driver of automobile 1. Display medium 10 and preceding vehicle 1101 exist in the foreground. In FIG. 11A, only the road (not illustrated) is superimposed on display medium 10, and it is determined that the color of the foreground is the first color.

In FIG. 11B, preceding vehicle 1101 is superimposed on display medium 10. The color of preceding vehicle 1101, for example, is red, and in such a case, it is determined that the second color superimposed on the foreground is red. When a relationship between automobile 1 and preceding vehicle 1101 is transitioned from a state illustrated in FIG. 11A to a state illustrated in FIG. 11B, the color of the foreground superimposed in display medium 10 is changed from the first color to the second color, and the control circuitry 1002 senses the color change.

Furthermore, in a case where a color of a portion of the foreground superimposed on a region on which a presentation image is displayed in display medium 10 is changed, it may be determined that the color of the foreground is changed. As described above, a range which becomes a criterion for determining that the color is changed in the foreground superimposed in display medium 10 is determined on the basis of the design specification. Then, the control circuitry 1002 senses, on the basis of the recognition result received by input unit 1001, that the color of the foreground is changed from the first color to the second color.

Control circuitry 1002 determines whether or not the second color satisfies a predetermined condition with respect to the third color of at least a part of the outer peripheral region in the first presentation image. FIG. 12A to FIG. 12D illustrate examples of the first presentation image. Hereinafter, the function of control circuitry 1002 will be described with reference to FIG. 12A to FIG. 12D.

Figure 12A:
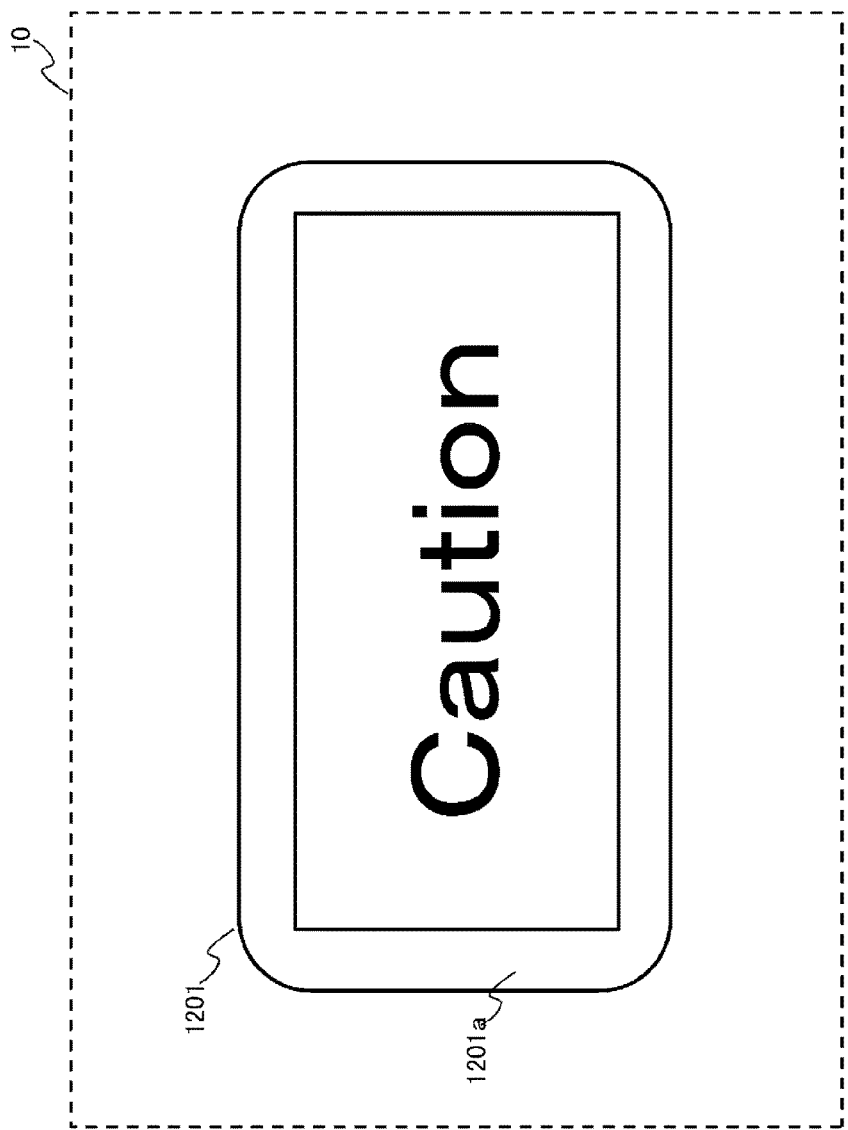
FIG. 12A is a diagram illustrating an example of a presentation image according to Exemplary Embodiment 2 of the present disclosure.

FIG. 12A illustrates first presentation image 1201. It is described that the color of region 1201*a* of presentation image 1201, for example, is red. FIG. 12B illustrates first presentation image 1202. It is described that the color of region 1202*a* of presentation image 1202 is red, as with region 1201*a*.

Figure 12C:
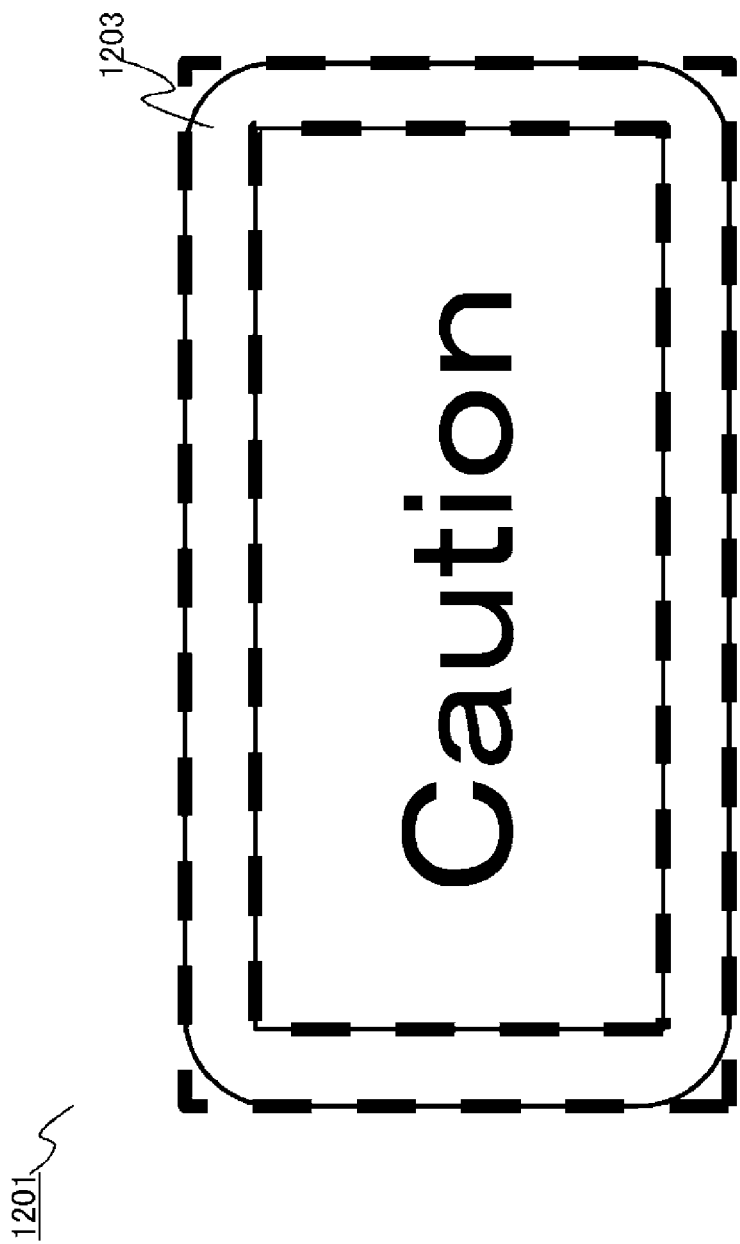
FIG. 12C is a diagram illustrating a region of the presentation image according to Exemplary Embodiment 2 of the present disclosure.
Figure 12D:
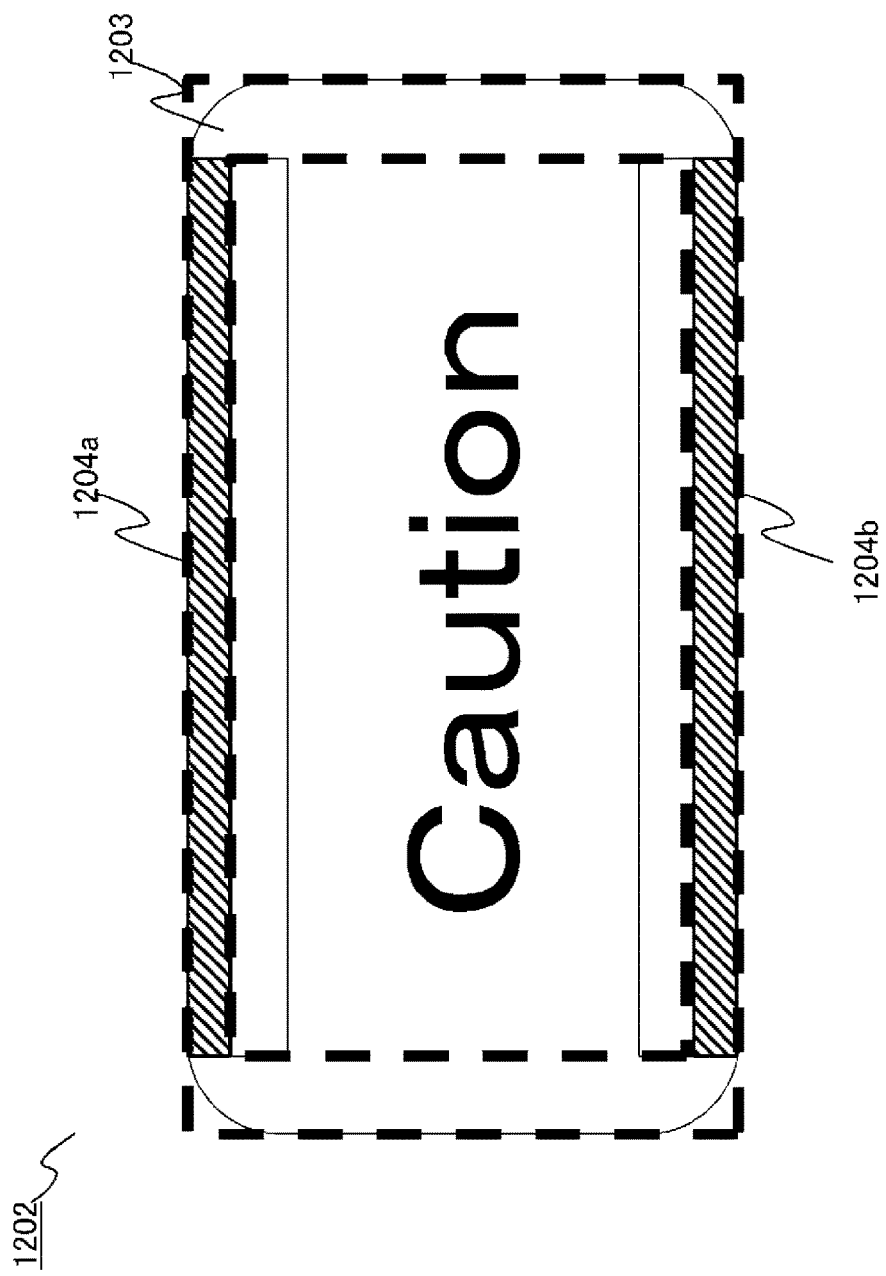
FIG. 12D is a diagram illustrating the region of the presentation image according to Exemplary Embodiment 2 of the present disclosure.

FIG. 12C is a diagram illustrating a region of presentation image 1201 illustrated in FIG. 12A. In FIG. 12C, a region included in broken line region 1203 is an outer peripheral region of presentation image 1201. The width of the outer peripheral region is determined in advance according to the design specification. FIG. 12D is a diagram illustrating a region of presentation image 1202 illustrated in FIG. 12B. In FIG. 12D, diagonal line region 1204*a* and diagonal line region 1204*b* included in broken line region 1203 are at least a part of an outer peripheral region of presentation image 1202 illustrated in FIG. 12B. Furthermore, diagonal line region 1204*a* and diagonal line region 1204*b* are illustrated by diagonal lines only for the sake of convenience of description.

As illustrated in FIG. 12C and FIG. 12D, the third color of at least a part of the outer peripheral region in the first presentation image is compared with the second color. Here, as described above, the second color, for example, is red. In addition, as described above, the color of region 1201*a* and region 1202*a* is red, and thus, the third color of at least a part of the outer peripheral region in the first presentation image is red.

Here, the predetermined condition, for example, indicates a similar color with respect to a compared color. The similar color includes the same color. That is, in a case where the compared color is any warm color, the predetermined condition is satisfied. In addition, in a case where one of the compared colors is a warm color, and the other is a cool color, the predetermined condition is not satisfied.

In addition, the predetermined condition may indicate whether or not all of the compared colors are colors represented by a gray scale. That is, in a case where one of the compared colors is white, black, gray, and the like, which are represented by the gray scale, and the other is colorful red, blue, green, yellow, pink, and the like, the predetermined condition may not be satisfied.

In addition, the predetermined condition may indicate whether or not the compared color is a color departing from a hue circle to a certain degree. That is, in a case where the compared color has a relationship with respect to a complementary color in the hue circle or in a case where the compared color exists in a region close to an opposite color in a hue circle, the predetermined condition is not satisfied. In addition, in a case where the compared colors exist in the adjacent regions in the hue circle, the predetermined condition is satisfied. Furthermore, the degree of the adjacency in the hue circle is determined on the basis of the design specification.

The predetermined condition may indicate that the compared color is a similar color. For example, when both of the second color and the third color are a warm color or a cool color, the predetermined condition is satisfied, and when the second color is a warm color, and the third color is a cool color, the predetermined condition is not satisfied. In addition, in a case where the second color and the third color exist in close regions in the hue circle, the predetermined condition may be satisfied.

When it is determined that the second color and the third color satisfy the predetermined condition, control circuitry 1002 causes in image generator 103 to generate a second predetermined image. The second predetermined image indicates a second presentation image at the time of displayed on display medium 10. The second presentation image includes at least region other than the outer peripheral region in the first presentation image, and the color of at least a part of an outer peripheral region in the second presentation image is a fourth color different from the third color.

Figure 13A:
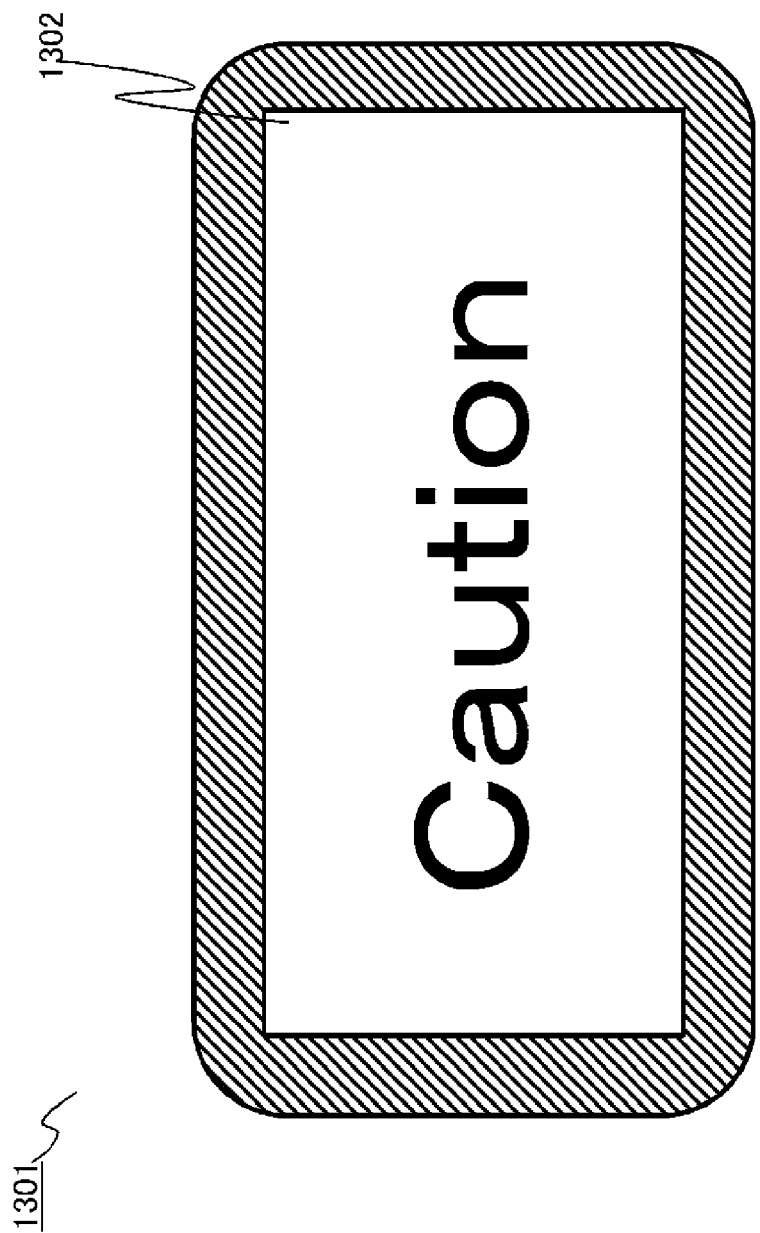
FIG. 13A is a diagram illustrating an example of the presentation image according to Exemplary Embodiment 2 of the present disclosure.
Figure 13B:
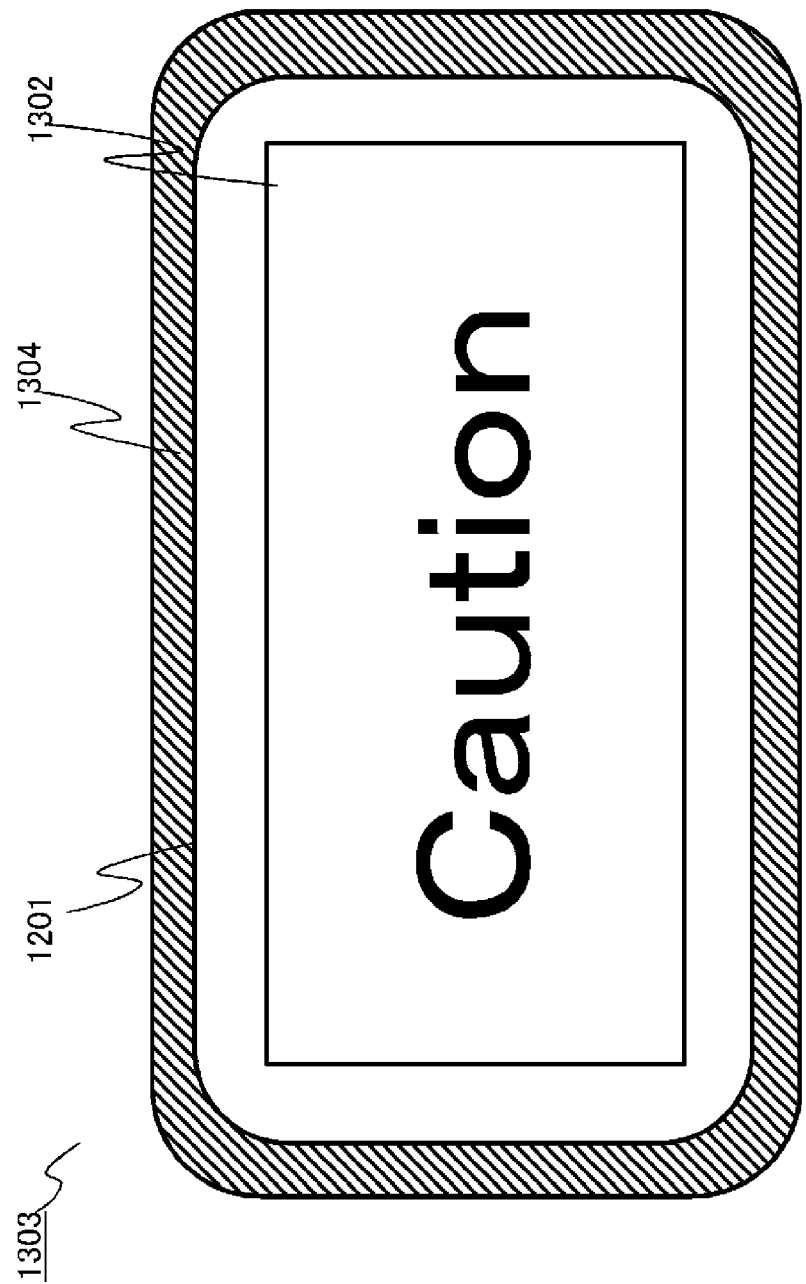
FIG. 13B is a diagram illustrating an example of the presentation image according to Exemplary Embodiment 2 of the present disclosure.
Figure 13C:
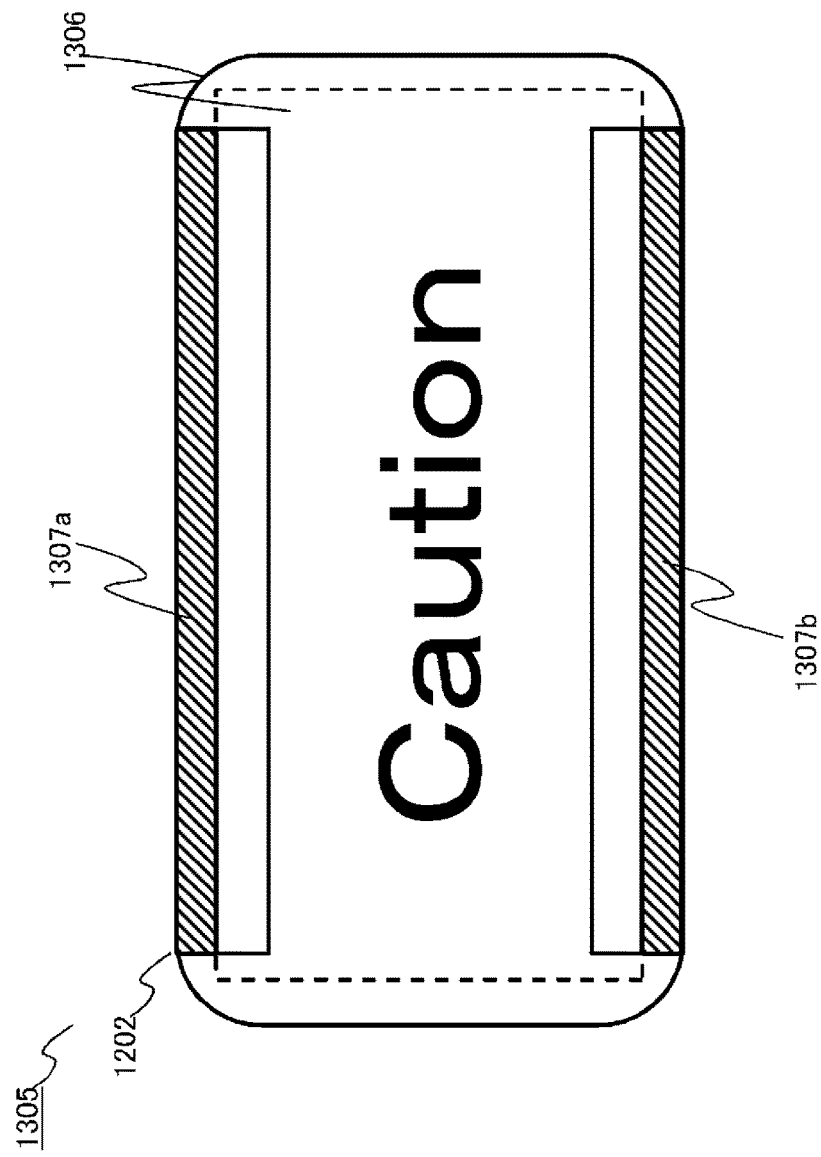
FIG. 13C is a diagram illustrating an example of the presentation image according to Exemplary Embodiment 2 of the present disclosure.

FIG. 13A to FIG. 13C illustrate examples of the second presentation image. Second presentation image 1301 illustrated in FIG. 13A includes region 1302 other than the outer peripheral region in first presentation image 1201, and the color of an outer peripheral region in second presentation image 1301 is the fourth color different from the third color of corresponding first presentation image 1201. Here, the fourth color, for example, is black. That is, second presentation image 1301 is an image including a region other than the outer peripheral region in first presentation image 1201, in which outer frame having the fourth color is disposed on an outer periphery of the region, and has substantially the same size as that of first presentation image 1201 and second presentation image 1301.

In addition, second presentation image 1303 illustrated in FIG. 13B includes region 1302 other than the outer peripheral region of first presentation image 1201 and the outer peripheral region of first presentation image 1201 (that is, includes at least region 1302 other than the outer peripheral region), and the color of outer peripheral region 1304 in second presentation image 1303 is the fourth color. Second presentation image 1303 is an image in which outer frame 1304 is added to first presentation image 1201. That is, second presentation image 1303 is an image in which outer frame 1304 having the fourth color is disposed on the outer periphery of first presentation image 1201.

In addition, second presentation image 1305 illustrated in FIG. 13C includes at least region 1306 other than the outer peripheral region in first presentation image 1202, and the color of at least parts of the outer peripheral region 1307a and 1307b in second presentation image 1305 is the fourth color.

Next, image generator 1003 generates a predetermined image on the basis of a control signal output from control circuitry 1002. The predetermined image is displayed on display medium 10 by output unit 1004 described below, and represents a figure having a predetermined shape.

Furthermore, the predetermined image may be an image, or may be image data. In a case where output unit 1004 described below has a projector function, image generator 1003 generates an image, and the image is projected onto display medium 10 by output unit 1004. On the other hand, in a case where output unit 1004 described below does not have the projector function, but display medium 10 is a transmissive display, or the like, image generator 1003 generates the image data, and the image data is output by output unit 1004.

Figure 22:
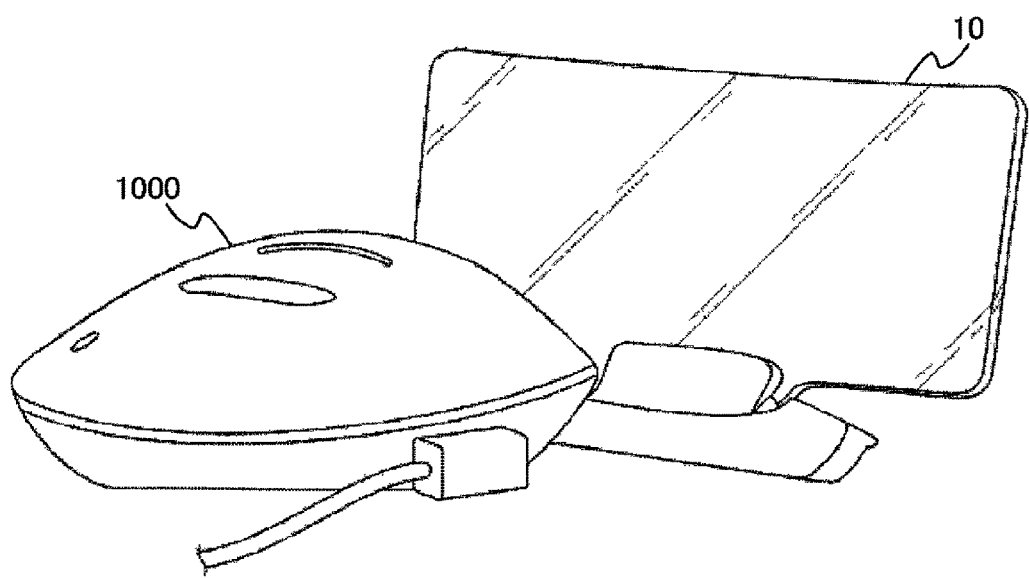
FIG. 22 is a diagram illustrating an example of a combiner according to Exemplary Embodiment 2 of the present disclosure.

Output unit 1004 displays figure having a predetermined shape on display medium 10 by outputting the predetermined image generated in image generator 1003 to display medium 10. Output unit 1004, for example, has the projector function, and performs direct projection with respect to display medium 10. Display medium 10, for example, is a front windshield of the movable body. In addition, display medium 10 may be a transparent combiner which is disposed independently from the windshield. An independent combiner is display medium 10 illustrated in FIG. 22.

That is, output unit 1004 projects the predetermined image onto the windshield, and thus, displays the presentation image on the windshield. The presentation image presenting the figure of the displayed predetermined shape is visually recognized by an occupant of the movable body as a virtual image. Furthermore, in the description of this exemplary embodiment, the output is defined as the broader concept of the projection.

In addition, output unit 1004, for example, outputs the image data to display medium 10, and thus, the figure having a predetermined shape may be displayed on display medium 10. In such a case, display medium 10 is a transmissive display, and the predetermined image generated in image generator 1003 is image data. That is, output unit 1004 outputs the image data to the transmissive display, and thus, the figure having a predetermined shape is displayed on the transmissive display.

Furthermore, a principle in which the image data input into the transmissive display is displayed as the figure having a predetermined shape is a known technology, and thus, the description thereof will be omitted.

In addition, display medium 10 may be a hologram. In a case where the hologram is used, a method may be used in which a light guide plate which guides a parallel luminous flux group satisfying a total internal reflection condition of a light guide plate as total internal reflection is used, a part of the parallel luminous flux group which is guided by the light guide plate as the total internal reflection exits, and thus, a virtual image is visually recognized by the occupant. Furthermore, in the method using the light guide plate, the image data is not directly projected as a projector, but for the sake of convenience of description, the method is described in the definition of projection as with a projector method.

Display medium 10, for example, is applied to a liquid crystal display (LCD), a head-up display (HUD), a head mount display or a helmet mount display (HMD), a spectacle type display (Smart Glasses), a display for navigation, a meter display, other dedicated displays, and the like. HUD, for example, may be the windshield of the vehicle, or may be a glass surface, a plastic surface, and the like which are disposed independently. In addition, the windshield, for example, may be a front glass, or may be side glass or back glass of the vehicle.

Further, as described above, display medium 10 may be a transmissive display. The transmissive display, for example, is a transmissive organic EL display or a transparent display using glass emitting light at the time of emitting light having a specific wavelength, and the driver is able to simultaneously visually recognize the background and visually recognize a display on the transmissive display. In addition, the transmissive display is display medium 10 transmitting light.

Figure 10:
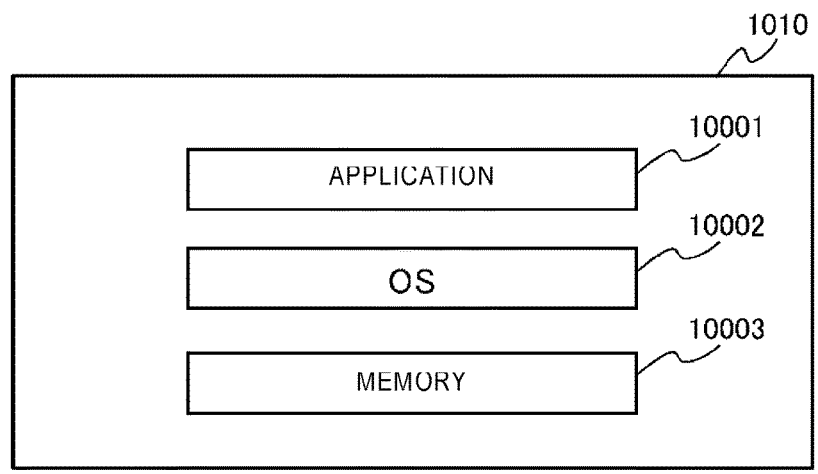
FIG. 10 is a block diagram illustrating another configuration example of the display control device according to Exemplary Embodiment 2 of the present disclosure.

FIG. 10 is a diagram illustrating another configuration example of display control device 1010. As illustrated in FIG. 10, display control device 1010 includes application 10001, operating system (OS) 10002, memory 10003, and other hardwares (not illustrated).

Application 10001, for example, is an application for functioning an onboard device or a portable information terminal as display control device 1010, and is executed by a processor of display control device 1010. Display control device 1010 may have the application by reading the application from non-transitory tangible computer-readable storage medium, or may have the application by downloading the application from the network.

OS 10002 is basic software of an onboard device or a portable information terminal, and is executed by the processor of display control device 1010. Memory 10003 is configured of a storage device such as RAM and ROM included in display control device 1010, and stores a data group included in application 10001. The processor of display control device 1010 executes application 10001, and thus, the function of input unit 1001 and control circuitry 1002 illustrated in FIG. 9 is realized. In addition, the processor of display control device 1010 executes application 10001, and thus, memory 10003 functions as an accumulator (not illustrated).

Figure 14:
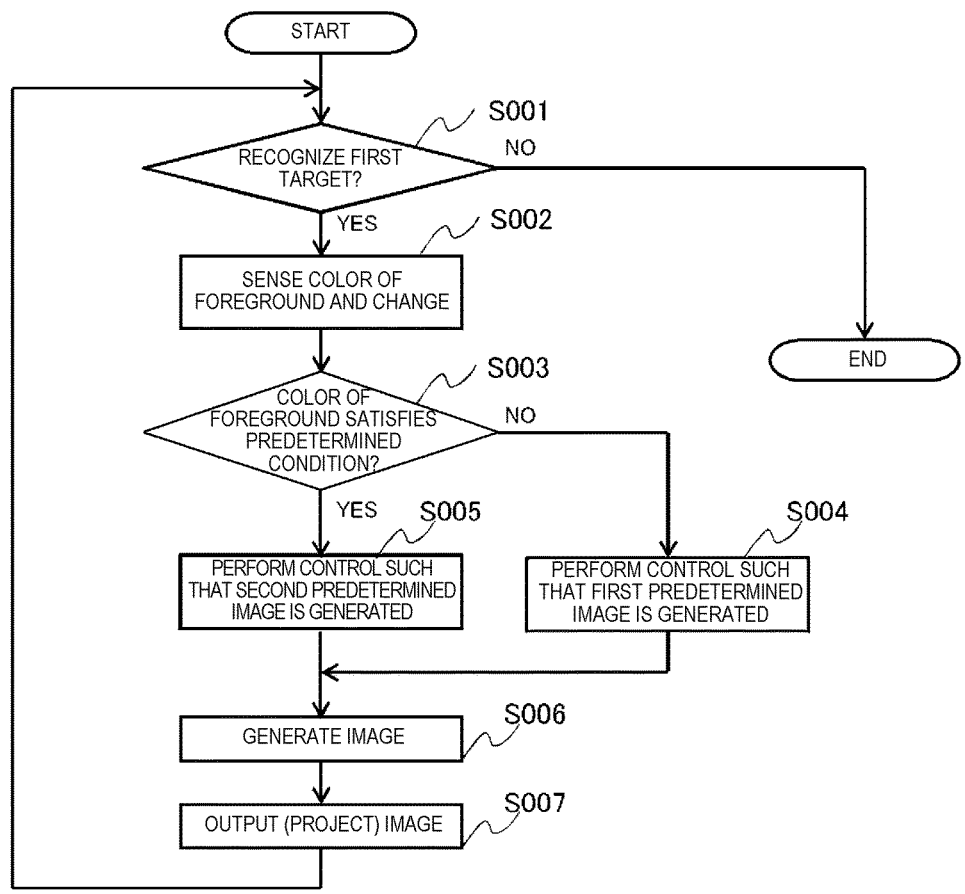
FIG. 14 is an operation flowchart of a display system according to Exemplary Embodiment 2 of the present disclosure.

FIG. 14 illustrates an operation flowchart of display system 100. The flow of FIG. 14, for example, is performed at a predetermined operation interval such as 30 milliseconds and 100 milliseconds. For example, in a case where sensor 2000 outputs vehicle peripheral information to input unit 1001 at a frame rate such as 15 fps and 30 fps, the flow of FIG. 14 is performed according to such an output interval. In addition, FIG. 15A to FIG. 15D illustrate conceptual diagrams in which the presentation image is changed from first presentation image 1201 to second presentation image 1301 according to a change in the color of the foreground of automobile 1. Hereinafter, the function of display device 1000 will be described with reference to FIG. 14 and FIG. 15A to FIG. 15D.

In Step S001, in a case where sensor 2000 recognizes a first target, the flow proceeds to Step S002 (S001: Yes).

In Step S002, control circuitry 1002 senses, on the basis of the recognition result received by input unit 1001, the color of the foreground of automobile 1 superimposed in display medium 10. In addition, in a case where a presentation image corresponding to the target is displayed on display medium 10 in advance, control circuitry 1002 senses a change in the color of the foreground which is superimposed.

For example, as illustrated in FIG. 11A, in a case where only the road (not illustrated) exists in the foreground superimposed in display medium 10, control circuitry 1002 senses the color of the foreground which is superimposed as gray (the first color). Next, the flow proceeds to Step S003.

In Step S003, control circuitry 1002 determines whether or not the color of the foreground which is superimposed satisfies a predetermined condition. Specifically, control circuitry 1002 determines whether or not the color of the foreground which is superimposed satisfies the predetermined condition with respect to the color of at least a part of the outer peripheral region in presentation image (the first presentation image) corresponding to the recognized first target.

As described above, the predetermined condition is a condition which is a similar color with respect to a compared color, a condition in which all compared colors are colors represented by a gray scale, a condition which is a color departing from a hue circle to a certain degree, or the like.

When control circuitry 1002 determines that the color of the foreground (gray or the like) which is superimposed and the color according to the presentation image corresponding to the first target (red or the like) do not satisfy the predetermined condition, the flow proceeds to Step S004 (S003: No).

In Step S004, control circuitry 1002 controls image generator 1003 such that image generator 1003 generates the first predetermined image indicating first presentation image 1201 at the time of being displayed on display medium 10 transmitting light.

In Step S006, image generator 1003 generates the first predetermined image according to control from control circuitry 1002.

Figure 15A:
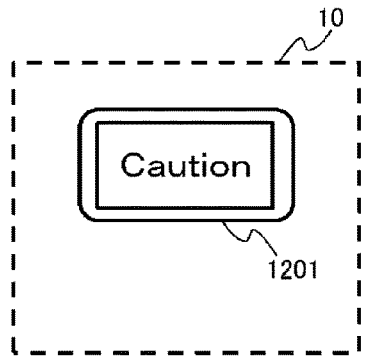
FIG. 15A is a diagram illustrating an example of the presentation image according to Exemplary Embodiment 2 of the present disclosure.

Next, in Step S007, as illustrated in FIG. 15A, output unit 1004 outputs the generated first predetermined image to display medium 10. Here, the output includes the meaning of projecting the first predetermined image with respect to display medium 10. FIG. 15C illustrates an aspect in which first presentation image 1201 is displayed on display medium 10. After that, the flow returns to Step S001.

In Step S001, in a case where the first target is continuously recognized, the flow proceeds to Step S002 (S001: Yes). On the other hand, in a case where the first target is not recognized, the flow ends (S001: No).

In Step S002, control circuitry 1002, senses, on the basis of the recognition result received by input unit 1001, that the color of the foreground on which first presentation image 1201 is superimposed in display medium 10 is changed from the first color to the second color different from the first color.

Figure 15B:
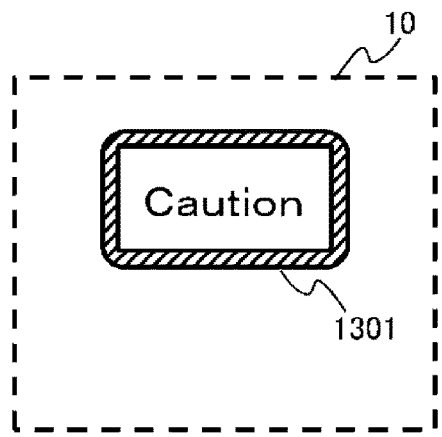
FIG. 15B is a diagram illustrating an example of the presentation image according to Exemplary Embodiment 2 of the present disclosure.
Figure 15C:
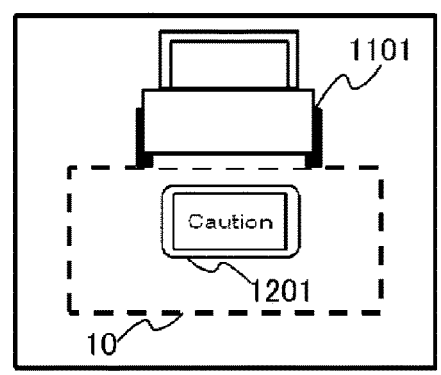
FIG. 15C is a diagram illustrating an aspect in which the presentation image according to Exemplary Embodiment 2 of the present disclosure is displayed on the display medium.
Figure 15D:
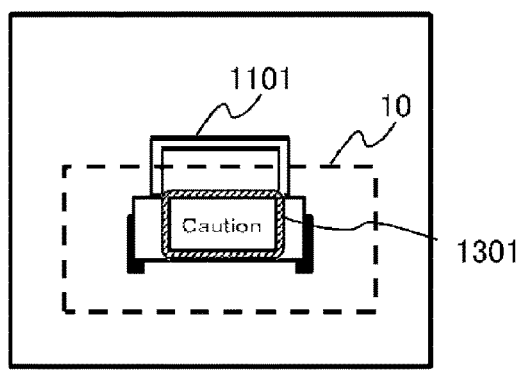
FIG. 15D is a diagram illustrating an aspect in which the presentation image according to Exemplary Embodiment 2 of the present disclosure is displayed on the display medium.

Here, as illustrated in FIG. 15D, it is described that red preceding vehicle 1101 exists in the foreground which is superimposed. In such a case, it is determined that the color of the foreground which is superimposed is the color of preceding vehicle 1101 (red). Next, the flow proceeds to Step S003.

In Step S003, control circuitry 1002 determines whether or not the color of the foreground (the second color) which is superimposed satisfies the predetermined condition. Specifically, control circuitry 1002 determines whether or not the color of the foreground (the second color) which is superimposed satisfies the predetermined condition with respect to the color of at least a part of the outer peripheral region (the third color) in first presentation image 1201. In such a case, the color of the foreground which is superimposed (the second color) is red, and the color of a part of first presentation image 1201 (the third color) is red, and thus, control circuitry 1002 determines that the predetermined condition is satisfied (S003: Yes). Next, the flow proceeds to Step S005.

Furthermore, for example, in a case where the color of preceding vehicle 1101 is white, in Step S003, it is determined that the predetermined condition is not determined. Even in a case where the color of the foreground (white) is changed, the color of the foreground is easily distinguished from the color of the outer peripheral region (red) of first presentation image 1201, and visibility of first presentation image 1201 of the user does not decrease.

Next, in Step S005, control circuitry 1002 causes image generator 1003 to generates the second predetermined image indicating second presentation image 1301 illustrated in FIG. 15B at the time of being displayed on display medium 10. Then, in Step S007, output unit 1004 outputs the second predetermined image to display medium 10. In FIG. 15D, preceding vehicle 1101 exists in the foreground which is superimposed on display medium 10, and thus, the color of the foreground, for example, is red, and the second presentation image 1301 is displayed on display medium 10.

As described above, in this exemplary embodiment, in a case where the color of the foreground which is superimposed on display medium 10 and the color of the outer peripheral region of first presentation image 1201 are similar colors or the like, second presentation image 1301 including at least a region other than the outer peripheral region in first presentation image 1201, in which the color of at least a part of the outer peripheral region is the fourth color different from the third color, is displayed on display medium 10. Accordingly, it is possible to continuously display a presentation image having high visibility while retaining the original meaning of the presentation image.

In general, a color which is able to allow the user to recall a warning is used in the color of the presentation image. The color recalling a warning, for example, is a warm color such as red and yellow. As with the related art, in a case where the color of the presentation image is changed according to the color of the foreground which is superimposed on display medium 10, the color recalling a warning is changed, and the meaning of the presentation image may be changed. On the other hand, according to the display control device of the present disclosure, only the color of the outer peripheral region of the presentation image is changed, and thus, it is possible to retain the color recalling a warning, and the meaning of the presentation image is not changed, and thus, it is possible to increase visibility of the presentation image.

Figure 16A:
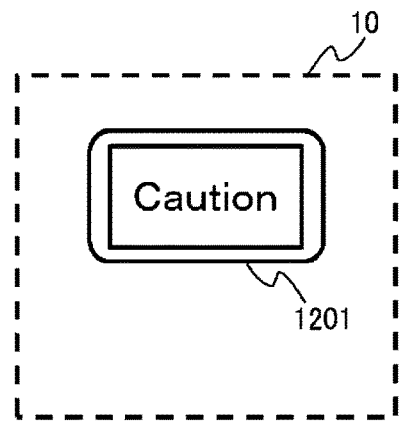
FIG. 16A is a diagram illustrating an example of the presentation image according to Exemplary Embodiment 2 of the present disclosure.
Figure 16B:
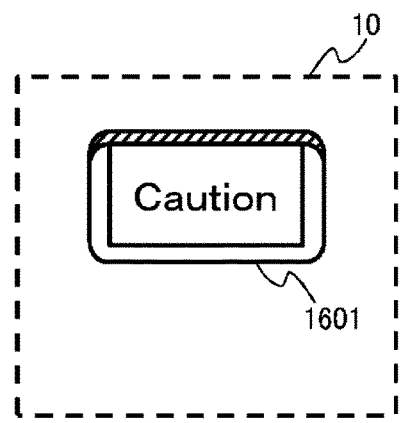
FIG. 16B is a diagram illustrating an example of the presentation image according to Exemplary Embodiment 2 of the present disclosure.
Figure 16C:
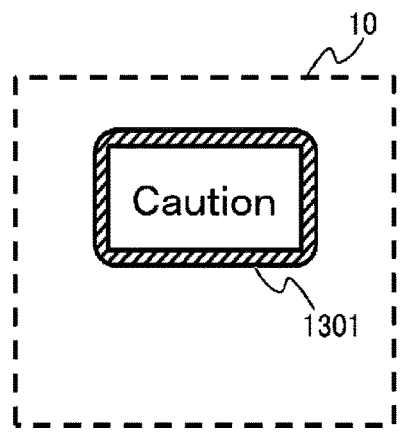
FIG. 16C is a diagram illustrating an example of the presentation image according to Exemplary Embodiment 2 of the present disclosure.
Figure 16D:
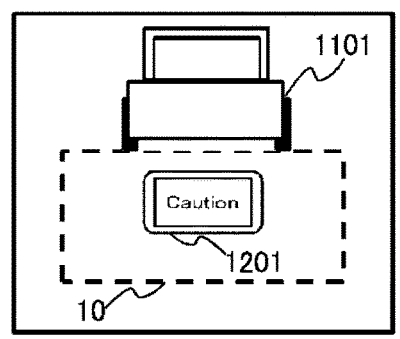
FIG. 16D is a diagram illustrating an aspect in which the presentation image according to Exemplary Embodiment 2 of the present disclosure is displayed on the display medium.
Figure 16E:
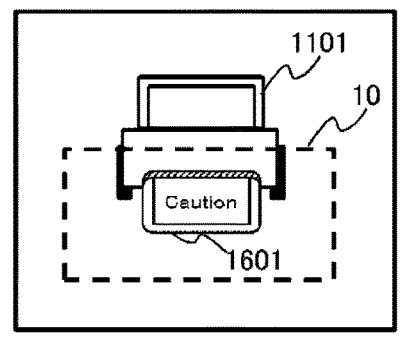
FIG. 16E is a diagram illustrating an aspect in which the presentation image according to Exemplary Embodiment 2 of the present disclosure is displayed on the display medium.
Figure 16F:
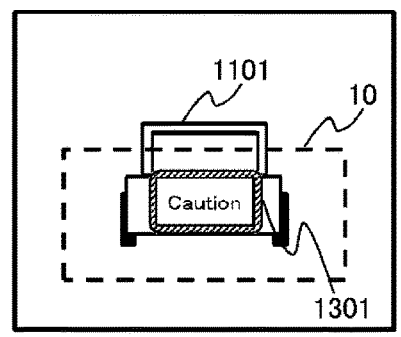
FIG. 16F is a diagram illustrating an aspect in which the presentation image according to Exemplary Embodiment 2 of the present disclosure is displayed on the display medium.
Figure 17A:
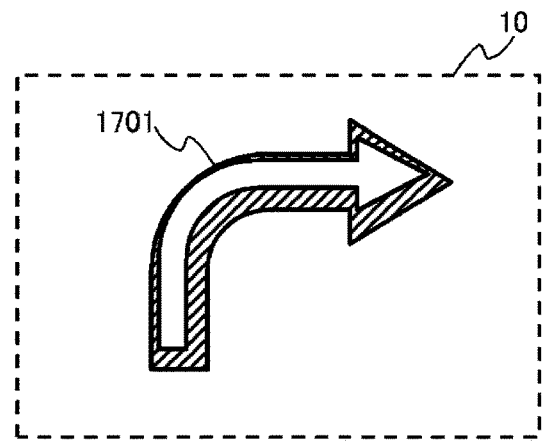
FIG. 17A is a diagram illustrating an example of the presentation image according to Exemplary Embodiment 2 of the present disclosure.
Figure 17B:
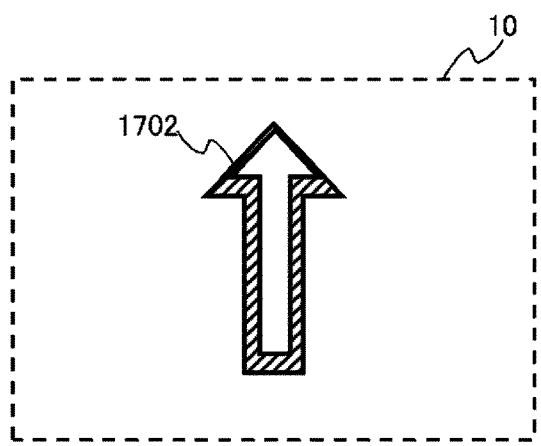
FIG. 17B is a diagram illustrating an example of the presentation image according to Exemplary Embodiment 2 of the present disclosure.
Figure 17C:
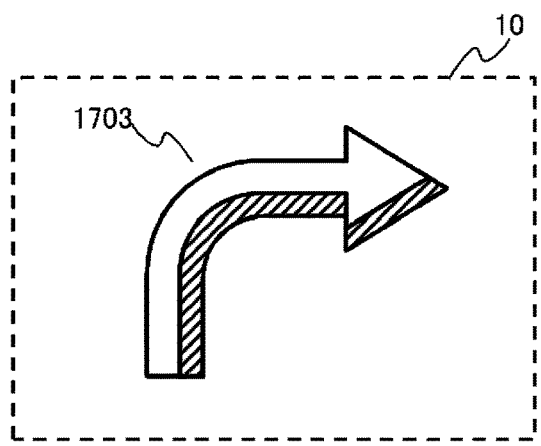
FIG. 17C is a diagram illustrating an example of the presentation image according to Exemplary Embodiment 2 of the present disclosure.
Figure 17D:
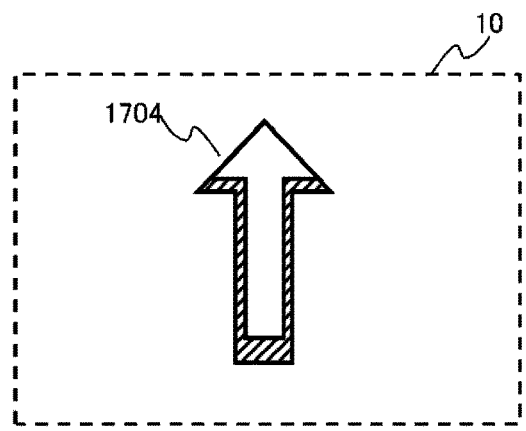
FIG. 17D is a diagram illustrating an example of the presentation image according to Exemplary Embodiment 2 of the present disclosure.

Furthermore, in the above description, a part of the outer peripheral region has the fourth color in second presentation image 1305. However, the second presentation image is not limited thereto. FIG. 16A to FIG. 16F illustrate the presentation image which is displayed on display medium 10, and a positional relationship between display medium 10 and preceding vehicle 1101. Furthermore, FIGS. 16A, 16C, 16D, and 16F are identical to FIG. 15A to FIG. 15D, and thus, the description thereof will be omitted. As illustrated in FIG. 16E, in a case where preceding vehicle 1101 is superimposed on a part of the presentation image in the foreground which is superimposed on display medium 10, as illustrated in FIG. 16B and FIG. 16E, presentation image 1601 may be used as the second presentation image. Accordingly, an effect is obtained in which it is possible to minimize a design change of an outer frame for increasing the visibility of the presentation image, and inconvenience due to a display change is not imparted to the driver.

Furthermore, in the above description, it is described that the width of the outer peripheral region of the second presentation image is substantially same in a vertical direction, but the width may be different according to the position in a peripheral direction as with second presentation images 1701 to 1704 illustrated in FIG. 17A to FIG. 17D.

Furthermore, the predetermined image is substantially identical to the figure having a predetermined shape. The predetermined image and the figure having a predetermined shape are slightly different from each other according to a condition such as the degree of curvature of display medium 10, but are substantially identical to each other. The predetermined image is generated by image generator 1003, and the figure having a predetermined shape is displayed on display medium 10.

Figure 18A:
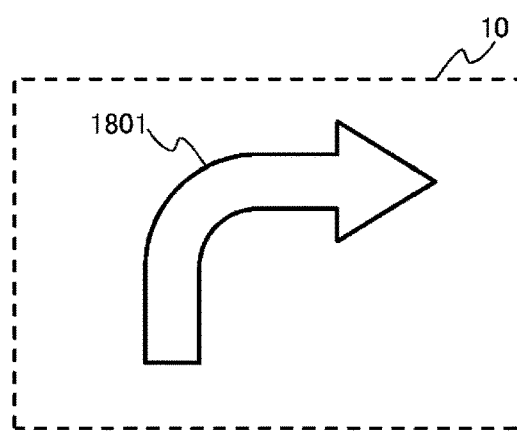
FIG. 18A is a diagram illustrating an example of the presentation image according to Exemplary Embodiment 2 of the present disclosure.
Figure 18B:
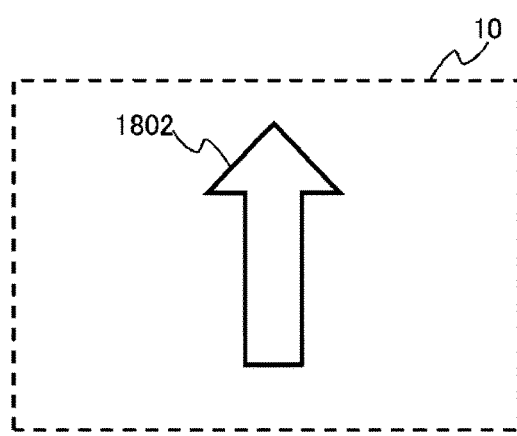
FIG. 18B is a diagram illustrating an example of the presentation image according to Exemplary Embodiment 2 of the present disclosure.
Figure 18C:
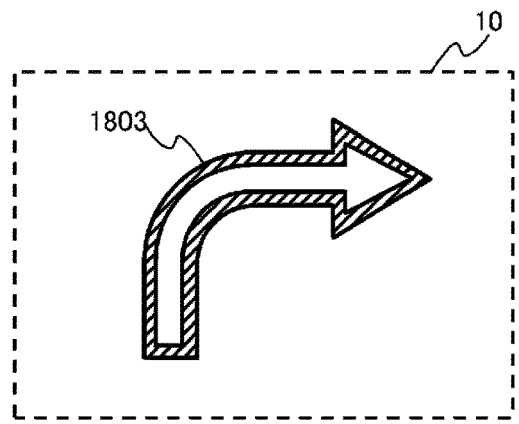
FIG. 18C is a diagram illustrating an example of the presentation image according to Exemplary Embodiment 2 of the present disclosure.
Figure 18D:
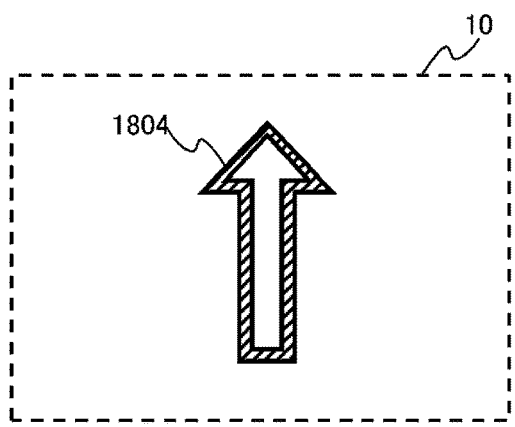
FIG. 18D is a diagram illustrating an example of the presentation image according to Exemplary Embodiment 2 of the present disclosure.
Figure 18E:
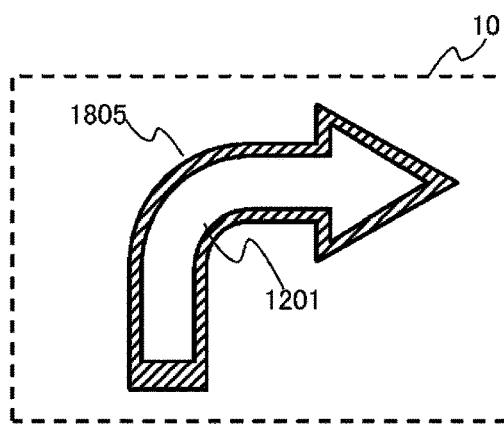
FIG. 18E is a diagram illustrating an example of the presentation image according to Exemplary Embodiment 2 of the present disclosure.
Figure 18F:
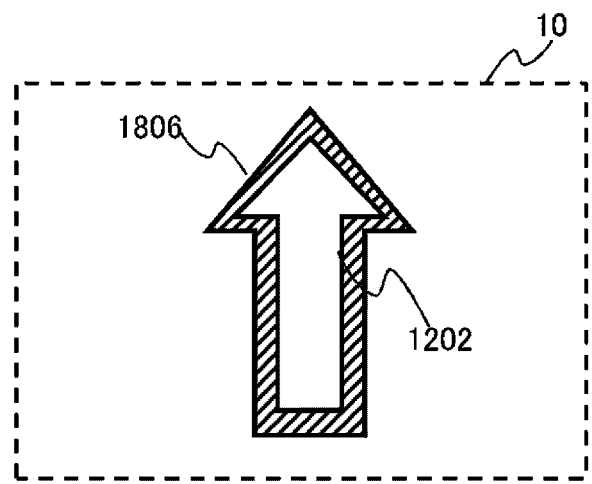
FIG. 18F is a diagram illustrating an example of the presentation image according to Exemplary Embodiment 2 of the present disclosure.

Furthermore, in the above description, an image indicating a warning is described as an example of the presentation image, and as illustrated in FIG. 18A to FIG. 18F, an image indicating the advance direction of automobile 1 may be used. FIG. 18A and FIG. 18B illustrate first presentation images 1801 and 1802, and FIG. 18C to FIG. 18F illustrate second presentation images 1803 to 1806. In such a case, a target which is recognized by sensor 2000, for example, is an intersection on the road, or the like, and when the intersection on the road is recognized by sensor 2000, first presentation image 1801 is displayed on display medium 10. Then, for example, when preceding vehicle 1101 is superimposed on the foreground through display medium 10, control circuitry 1002 controls image generator 1003 such that second presentation image 1803 or second presentation image 1805 is displayed on display medium 10.

As described above, Exemplary Embodiment 2 of the present disclosure has been described, but the present disclosure is not limited to Exemplary Embodiment 1 and Exemplary Embodiment 2, and various modifications are able to be performed. Hereinafter, a modification example will be described.

Modification Example

Control circuitry 1002 may further cause image generator 1003 to generate the second predetermined image at the time of sensing that the color of the foreground which is superimposed on display medium 10 is changed from the second color to the first color on the basis of the recognition result.

FIG. 19 illustrates an operation flowchart of a modification example of display system 100 in this exemplary embodiment. The description of the same configuration as that in the operation flowchart of FIG. 14 will be omitted. FIG. 20A to FIG. 20F illustrate examples of the transition of the presentation image. Hereinafter, the operation of the modification example of display system 100 will be described with reference to FIG. 19 and FIG. 20A to FIG. 20F.

In Step S002, control circuitry 1002 senses, result received by input unit 1001, the color of the foreground on which first presentation image 1201 is superimposed in display medium 10 on the basis of the recognition. In an aspect illustrated in FIG. 20D, control circuitry 1002 senses the color of the foreground which is superimposed (the first color), for example, as gray. For example, the road exists in the foreground.

Figure 20A:
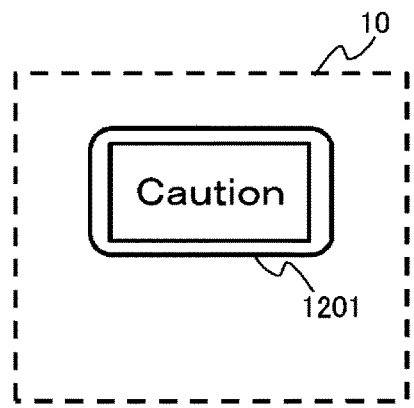
FIG. 20A is a diagram illustrating an example of the presentation image according to Exemplary Embodiment 2 of the present disclosure.
Figure 20B:
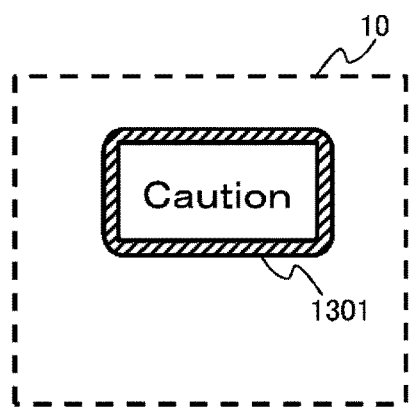
FIG. 20B is a diagram illustrating an example of the presentation image according to Exemplary Embodiment 2 of the present disclosure.

In Step S101, control circuitry 1002 determines whether or not second presentation image 1301 illustrated in FIG. 20B is displayed on display medium 10 corresponding to the first target at a previous time on the basis of information stored in a memory (not illustrated). At the previous time, in a case where second presentation image 1301 is not displayed on display medium 10 (S101: No), the flow proceeds to Step S003.

Figure 20C:
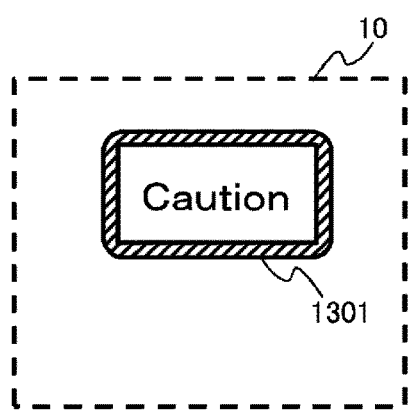
FIG. 20C is a diagram illustrating an example of the presentation image according to Exemplary Embodiment 2 of the present disclosure.
Figure 20D:
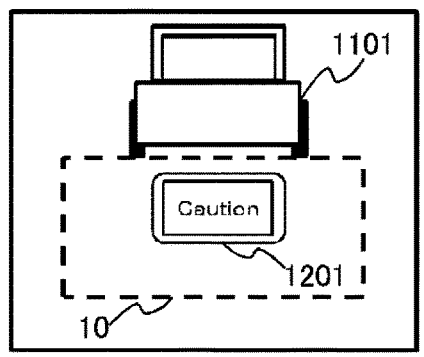
FIG. 20D is a diagram illustrating an aspect in which the presentation image according to Exemplary Embodiment 2 of the present disclosure is displayed on the display medium.

According to the processing in Step S004, Step S006, and Step S007, display control device 1010 controls image generator 1003 such that first presentation image 1201 is displayed on display medium 10, as illustrated in FIG. 20A and FIG. 20D.

Figure 20E:
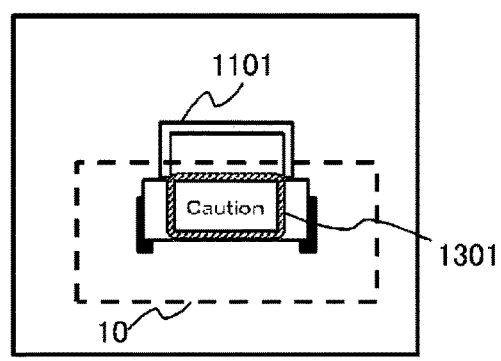
FIG. 20E is a diagram illustrating an aspect in which the presentation image according to Exemplary Embodiment 2 of the present disclosure is displayed on the display medium.

Next, the flow returns to Step S001, when the first target is continuously recognized, in Step S002, control circuitry 1002 senses that the color of the foreground which is superimposed is changed from the first color (for example, gray or the like) to the second color (for example, red or the like). In such a case, for example, as illustrated in FIG. 20E, preceding vehicle 1101 exists in the foreground which is superimposed on display medium 10. Then, the second presentation image is not displayed on display medium 10 at the previous time, and thus, the flow proceeds to Step S003 (S101: No).

In Step S003, it is determined whether or not the color of the foreground which is superimposed (the second color) satisfies the predetermined condition described above, and when it is determined that the predetermined condition is satisfied, the flow proceeds to Step S005 (S003: Yes).

According to the processing in Step S005 to Step S007, control circuitry 1002 controls image generator 1003 such that second presentation image 1301 is displayed on display medium 10, as illustrated in FIG. 20B and FIG. 20E.

Figure 20F:
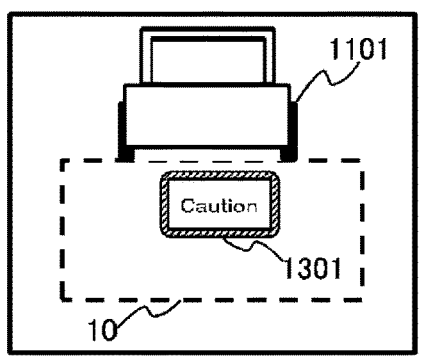
FIG. 20F is a diagram illustrating an aspect in which the presentation image according to Exemplary Embodiment 2 of the present disclosure is displayed on the display medium.

Next, the flow returns to Step S001, when the first target is continuously recognized, in Step S002, control circuitry 1002 senses that the color of the foreground which is superimposed is changed from the second color (for example, red) to the first color (for example, gray or the like). In such a case, for example, as illustrated in FIG. 20F, the road (not illustrated) exists in the foreground which is superimposed on display medium 10. Then, control circuitry 1002 recognizes that the second presentation image is displayed on display medium 10 at the previous time on the basis of the information retained in the memory (not illustrated). The flow proceeds to Step S005 (S101: Yes).

Then, according to the processing in Step S005 to Step S007, the control circuitry controls image generator 1003 such that second presentation image 1301 is displayed on display medium 10, as illustrated in FIG. 20C and FIG. 20F.

Thus, in a case where second presentation image 1301 is displayed on display medium 10 one time, control circuitry 1002 may continuously display second presentation image 1301 even in a case where the color of the foreground returns to the first color from the second color. Accordingly, a fact that second presentation image 1301 is information with respect to the same event is able to be obviously presented to the driver, and the driver visually recognizes the presentation image, and thus, is not confused whether or not information with respect to a new event is provided. In such a case, in a case where the display returns to first presentation image 1201, a visual sense of the presentation image is considerably changed, and thus, the driver is confused whether the same warning with respect to the same event is provided or warning with respect to another new event is provided, and a driving operation is affected.

In addition, inconvenience of display due to a frequent change in the design of the presentation image is imparted to the driver of automobile 1, and thus, interrupts the driving operation. Further, in a case where the design is changed, a correspondence relationship with respect to the first target is not able to be obtained, and confusion may occur.

Furthermore, the function of display control device 1010 in each of the exemplary embodiments described above is able to be realized by a computer program.

Figure 21:
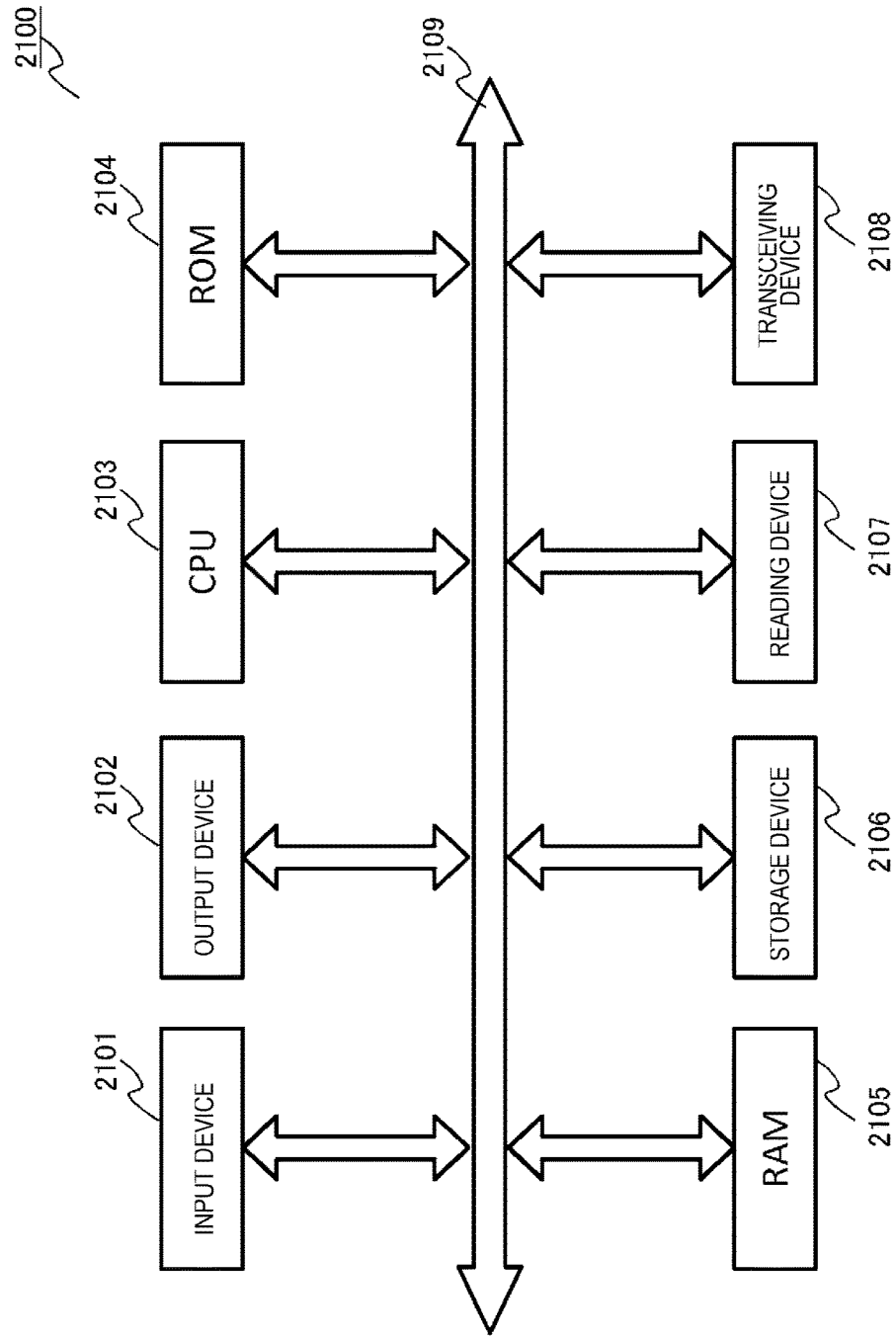
FIG. 21 is a hardware configuration diagram of the display systems and the display control devices according to Exemplary Embodiment 1 or 2 of the present disclosure.

FIG. 21 is a diagram illustrating a hardware configuration of computer 2100 in which the function of each unit is realized by a program. Computer 2100 includes input device 2101 such as an input button and a touch pad, output device 2102 such as a display or a speaker, central processing device (CPU) 2103, read only memory (ROM) 2104, random access memory (RAM) 2105, storage device 2106 such as a hard disk device or a solid state drive (SSD), reading device 2107 which reads out information from a recording medium such as a digital versatile disk read only memory (DVD-ROM) or an universal serial bus (USB) memory, and transceiver 2108 which performs communication through the network, and the respective units are connected to each other through bus 2109.

Then, reading device 2107 reads out a program from a recording medium in which the program for realizing the function of each of the units is recorded, and stores the program in storage device 2106. Alternatively, transceiver 2108 performs communication with respect to a server device connected to the network, and the program for realizing the function of each of the units, which is downloaded from the server device, is stored in storage device 2106.

Then, CPU 2103 copies the program stored in storage device 2106 to RAM 2105, and the life time included in the program is sequentially read out from RAM 2105 and executed, and thus, the function of each of the units is realized. In addition, when the program is executed, information which is obtained by various processings described in each of the exemplary embodiments is stored in RAM 2105 or storage device 2106, and is suitably used.

INDUSTRIAL APPLICABILITY

A display control device, a display device, a display control program, a display control method, and a recording medium according to the present invention are useful for displaying a presentation image having high visibility while retaining the meaning of the image.

The invention claimed is:
1. A display control device, comprising:
an input unit receiving a recognition result of a surrounding situation of a vehicle; and
control circuitry controlling an image generating device such that a predetermined image indicating a presentation image at the time of being displayed on a display medium transmitting light is generated in a case in which a predetermined target is recognized in the vicinity of the vehicle,
wherein the control circuitry causes the image generating device to generate a first predetermined image indicating a first presentation image, senses, on the basis of the recognition result, that a color of a foreground of the vehicle on which the first presentation image is superimposed in the display medium is changed from a first color to a second color different from the first color, and causes the image generating device to generate a second predetermined image indicating a second presentation image when the second color satisfies a predetermined condition with respect to a third color of at least a part of an outer peripheral region in the first presentation image,
the second presentation image includes at least a region other than the outer peripheral region in the first presentation image, and
a color of at least a part of an outer peripheral region in the second presentation image is a fourth color different from the third color.

2. The display control device of claim 1,
wherein the predetermined condition is a similar color with respect to a compared color.

3. The display control device of claim 1,
wherein the control circuitry further causes the image generating device to generate the second predetermined image at the time of sensing, on the basis of the recognition result, that the color of the foreground superimposed on the display medium is changed from the second color to the first color.

4. The display control device of claim 1, wherein the second presentation image includes a region other than the outer peripheral region in the first presentation image, is an image in which an outer frame of the fourth color is disposed on an outer periphery of the region, and has substantially the same size as a size of the first presentation image and a size of the second presentation image.

5. The display control device of claim 1, wherein the second presentation image is an image in which an outer frame of the fourth color is disposed on an outer periphery of the first presentation image.

6. The display control device of claim 1, wherein an outer peripheral region of the presentation image is a region having a predetermined width along an outer periphery of the presentation image.

7. The display control device of claim 1, wherein an outer peripheral region of the presentation image is a region along an outer periphery of the presentation image, and has a width which is different according to a position in a peripheral direction.

8. The display control device of claim 1, wherein the control circuitry determines, on the basis of the recognition result, the color of the foreground on which the presentation image is superimposed through the display medium, in a case in which a predetermined target is recognized in the vicinity of the vehicle.

9. A display device, comprising:
an input unit receiving a recognition result of a surrounding situation of a vehicle;
control circuitry;
an image generator generating, according to control of the control circuitry, a predetermined image indicating a presentation image at the time of being displayed on a display medium transmitting light, in a case in which a predetermined target is recognized in the vicinity of the vehicle; and
an output unit outputting the predetermined image to the display medium,
wherein the control circuitry causes the image generator to generate a first predetermined image indicating a first presentation image, senses, on the basis of the recognition result, that a color of a foreground of the vehicle on which the first presentation image is superimposed in the display medium is changed from a first color to a second color different from the first color, and generates a second predetermined image indicating a second presentation image by using the image generator when the second color satisfies a predetermined condition with respect to a third color of at least a part of an outer peripheral region in the first presentation image,
the second presentation image includes at least a region other than the outer peripheral region in the first presentation image, and
a color of at least a part of an outer peripheral region in the second presentation image is a fourth color different from the third color.

10. A display device, comprising:
a display medium transmitting light;
an input unit inputting a recognition result of a surrounding situation of a vehicle;
control circuitry;
an image generator generating, according to control of the control circuitry, a predetermined image indicating a presentation image at the time of being displayed on the display medium, in a case in which a predetermined target is recognized in the vicinity of the vehicle; and
an output unit outputting the predetermined image to the display medium,
wherein the control circuitry causes the image generator to generate a first predetermined image indicating a first presentation image, senses, on the basis of the recognition result, that a color of a foreground of the vehicle on which the first presentation image is superimposed in the display medium is changed from a first color to a second color different from the first color and generates a second predetermined image indicating a second presentation image by using the image generator when the second color satisfies a predetermined condition with respect to a third color of at least a part of an outer peripheral region in the first presentation image,
the second presentation image includes at least a region other than the outer peripheral region in the first presentation image, and
a color of at least a part of an outer peripheral region in the second presentation image is a fourth color different from the third color.

11. A display control method of a display control device of a display system including a sensor which outputs a recognition result by recognizing a surrounding situation of a vehicle, and an image generating device which generates a predetermined image indicating a presentation image at the time of being displayed on a display medium transmitting light in a case in which a predetermined target is recognized in the vicinity of the vehicle, the display control method, comprising:
causing the image generating device to generate a first predetermined image indicating a first presentation image;
sensing, on the basis of the recognition result, that a color of a foreground of the vehicle on which the first presentation image is superimposed in the display medium is changed from a first color to a second color different from the first color; and
causing the image generating device to generate a second predetermined image indicating a second presentation image when the second color satisfies a predetermined condition with respect to a third color of at least a part of an outer peripheral region in the first presentation image,
wherein the second presentation image includes at least a region other than the outer peripheral region in the first presentation image, and
a color of at least a part of an outer peripheral region in the second presentation image is a fourth color different from the third color.

12. A non-transitory tangible computer-readable recording medium recording a display control program executed in a display control device of a display system including a sensor which outputs a recognition result by recognizing a surrounding situation of a vehicle, and an image generating device which generates a predetermined image indicating a presentation image at the time of being displayed on a display medium transmitting light in a case in which a predetermined target is recognized in the vicinity of the vehicle, the non-transitory tangible computer-readable recording medium the program causes a computer to execute:

processing of causing the image generating device to generate a first predetermined image indicating a first presentation image;

processing of sensing, on the basis of the recognition result, that a color of a foreground of the vehicle on which the first presentation image is superimposed in the display medium is changed from a first color to a second color different from the first color; and processing of causing the image generating device to generate a second predetermined image indicating a second presentation image when the second color satisfies a predetermined condition with respect to a third color of at least a part of an outer peripheral region in the first presentation image, wherein the second presentation image includes at least a region other than the outer peripheral region in the first presentation image, and a color of at least a part of an outer peripheral region in the second presentation image is a fourth color different from the third color.

* * * * *